US009269081B1

(12) United States Patent
Panzer

(10) Patent No.: US 9,269,081 B1
(45) Date of Patent: Feb. 23, 2016

(54) SEEDING USER CONNECTIONS IN A SOCIAL NETWORK

(71) Applicant: Google Inc., Mountain View, CA (US)

(72) Inventor: John Panzer, Mountain View, CA (US)

(*) Notice: Subject to any disclaimer, the term of this patent is extended or adjusted under 35 U.S.C. 154(b) by 681 days.

(21) Appl. No.: 13/651,163

(22) Filed: Oct. 12, 2012

(51) Int. Cl.
*G06Q 10/10* (2012.01)

(52) U.S. Cl.
CPC .................................. *G06Q 10/107* (2013.01)

(58) Field of Classification Search
CPC ...... G06Q 50/01; H04L 51/32; H04L 12/588; H04N 21/4788; H04N 21/632
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 7,908,327 | B2 | 3/2011 | Kucharewski et al. |
| 8,224,916 | B2 | 7/2012 | Kucharewski et al. |
| 8,812,404 | B2 * | 8/2014 | Aleong et al. ............... 705/319 |
| 8,813,187 | B1 * | 8/2014 | Daniel ............................. 726/2 |
| 9,087,131 | B1 * | 7/2015 | Gundotra .......... G06F 17/30477 |
| 9,117,197 | B1 * | 8/2015 | Sharma .................. G06Q 10/10 |
| 2002/0137490 | A1 | 9/2002 | Gallant |
| 2002/0143874 | A1 | 10/2002 | Marquette et al. |
| 2004/0236729 | A1 | 11/2004 | Dingledine et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0069753 | A1 * | 3/2006 | Hu et al. ....................... 709/220 |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |

(Continued)

FOREIGN PATENT DOCUMENTS

| | | |
|---|---|---|
| KR | 1020120045861 | 5/2012 |
| WO | WO0279984 | 10/2002 |
| WO | 2005086723 | 9/2005 |

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Sargon Nano
(74) *Attorney, Agent, or Firm* — Patent Law Works LLP

(57) ABSTRACT

An example implementation includes identifying a cluster of associated users that includes a plurality of unregistered users based at least in part on message-related information related to a first user. The unregistered users are users that have not been registered to use a social networking service. An invitation is sent to each of the plurality of unregistered users to join the social networking service and two or more requests to join the social networking service are received from two or more interested users, respectively, the two or more interested users being included in the plurality of unregistered users. Each of the two or more interested users is registered to use the social networking service based at least in part on a join criterion.

27 Claims, 8 Drawing Sheets

(56) References Cited

U.S. PATENT DOCUMENTS

| | | | |
|---|---|---|---|
| 2007/0248077 | A1 | 10/2007 | Mahle, Jr. et al. |
| 2008/0056475 | A1 | 3/2008 | Brannick et al. |
| 2008/0091723 | A1* | 4/2008 | Zuckerberg et al. ....... 707/104.1 |
| 2008/0192656 | A1 | 8/2008 | Vagelos |
| 2010/0169161 | A1 | 7/2010 | Sacco |
| 2011/0098156 | A1 | 4/2011 | Ng et al. |
| 2011/0153423 | A1* | 6/2011 | Elvekrog ............... G06Q 30/02 705/14.53 |
| 2011/0246574 | A1 | 10/2011 | Lento et al. |
| 2011/0276396 | A1* | 11/2011 | Rathod ...................... 705/14.49 |
| 2011/0288935 | A1* | 11/2011 | Elvekrog ........... G06Q 30/0255 705/14.53 |
| 2011/0288937 | A1* | 11/2011 | Manoogian, III .. G06Q 30/0251 705/14.66 |
| 2011/0289011 | A1* | 11/2011 | Hull ..................... G06Q 10/107 705/319 |
| 2012/0011212 | A1 | 1/2012 | He et al. |
| 2012/0158751 | A1 | 6/2012 | Tseng |
| 2012/0166532 | A1 | 6/2012 | Juan et al. |
| 2013/0013686 | A1 | 1/2013 | Kucharewski et al. |
| 2013/0287269 | A1* | 10/2013 | Gossweiler et al. .......... 382/118 |
| 2013/0318180 | A1* | 11/2013 | Amin et al. .................... 709/206 |
| 2014/0067943 | A1* | 3/2014 | Jackson et al. ................ 709/204 |
| 2014/0089400 | A1* | 3/2014 | Yan et al. ....................... 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report and Written Opinion, PCT/US2013/064652, Jan. 20, 2014, 10 pages.

* cited by examiner

Status of invitation request

702 ↗

Date of invitation request: 5/1/2011
Name of Group to be created: Close Friends
Number of invitations accepted: 3
Number of acceptances still needed to create group: 3

704 ↗

| Individuals invited | Invitation status | Actions |
|---|---|---|
| Jack S., | Accepted | Contact |
| Emily J., | Accepted | Contact |
| Scott B., | Accepted | Contact |
| Mike K. | Pending | Resend invitation |
| John C. | Pending | Resend invitation |
| Amy L. | Pending | Resend invitation |
| Greg J. | Pending | Resend invitation |
| Jill C. | Pending | Resend invitation |
| Melanie R. | Pending | Resend invitation |
| Matt D. | Pending | Resend invitation |
| Derrick K. | Pending | Resend invitation |

User: John Public

SEEDING USER CONNECTIONS IN A SOCIAL NETWORK

BACKGROUND

The present disclosure relates to seeding user connections in a social network.

In recent years, online social networking services have become a popular mechanism for interaction between users over the Internet. For example, users can use the functionality of a social network to interact with friends and relatives by posting thoughts, news articles, photos, and videos, about oneself or others, meet others with similar interests, and network with colleagues. Users often join a social network knowing their friends are also using the service.

However, a new social networking service can have difficulty attracting users to join. In some cases, this difficulty is due to a causality dilemma where the value of the new service cannot be demonstrated until a critical mass of users join, and where users who are not members are reluctant to join the new service because the value of doing so has not been made clear to them. For example, those who are not members of the new service may be reluctant to join because they believe that none of their friends are using it, and those friends who are using it may enjoy the features of the service but may have difficulty demonstrating the value of those features to their non-member friends until those friends join.

SUMMARY

According to one innovative aspect of the subject matter being described in this disclosure, a system identifies a cluster of associated users that includes a plurality of unregistered users based at least in part on message-related information related to a first user. The unregistered users are users that have not been registered to use a social networking service. The system sends an invitation to each of the plurality of unregistered users to join the social networking service and two or more requests to join the social networking service are received by the system from two or more interested users, respectively, the two or more interested users being included in the plurality of unregistered users. Each of the two or more interested users is registered to use the social networking service by the system based at least in part on a join criterion.

In general, another innovative aspect of the subject matter described in this disclosure may be embodied in methods that include identifying, based at least in part on message-related information related to a first user, a cluster of associated users that includes a plurality of unregistered users, the plurality of unregistered users not being registered to use a social networking service; sending an invitation to each of the plurality of unregistered users to join the social networking service; receiving two or more requests to join the social networking service from two or more interested users, respectively, the two or more interested users included in the plurality of unregistered users; and registering each of the two or more interested users to use the social networking service based at least in part on a join criterion.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include determining the join criterion as being satisfied based at least in part on a total number of the two or more requests to join the social networking service that were received; that the registering of each of the two or more interested users to use the social networking service is based at least in part on the determining of the join criterion as being satisfied; receiving a request to identify the cluster of associated users from the first user; that the identifying, based at least in part on the message-related information related to the first user, the cluster of associated users includes aggregating the message-related information from one or more information sources storing electronic messages associated with the first user; upon the registering of each of the two or more interested users, connecting the two or more interested users to one another on the social networking service by defining, in a social graph, a social graph connection between each of the two or more interested users; identifying, from among the cluster of associated users, a registered user that is registered to use the social networking service; sending an invitation to the registered user to connect with the plurality of unregistered users; receiving a connection request from the registered user accepting the invitation sent to the registered user; connecting the registered user to each of the two or more interested users by defining, in the data store, a social graph connection between the registered user and each of the two or more interested users; connecting the first user to each of the two or more interested users by defining, in the social graph, a social graph connection between the first user and each of the two or more interested users; that the registering of each of the two or more interested users further includes registering the first user to use the social networking service based at least in part on the join criterion; receiving a post from the first user or one of the two or more interested users; populating a content stream of the first user and each of the two or more interested users with the post; determining a shared group name based at least in part on the message-related information; and defining, in the social graph, a shared group including the first user and the two or more interested users based at least in part on the shared group name, the social graph connection between the first user and each of the two or more interested users, and the social graph connection between each of the two or more interested users.

For instance, the features may include that the electronic messages include one or more of electronic mail messages, SMS/MMS messages, instant messages, social network posts, social network notifications, and micro blog posts.

These implementations are particularly advantageous in a number of respects. For instance, they can incentivize a group of users who are not registered members of a social network to join the network by joining together, provide a satisfying and engaging experience for these newly joined users from the outset of their experience using the social network, automatically organize the friends of each newly joined user into a shared group, automatically identify and connect the newly joined users with friends who were already registered members of the social network, etc. It should be understood, however, that this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is a graphic representation of an example user interface for displaying the status of an invitation request.

DETAILED DESCRIPTION

Figure 1:
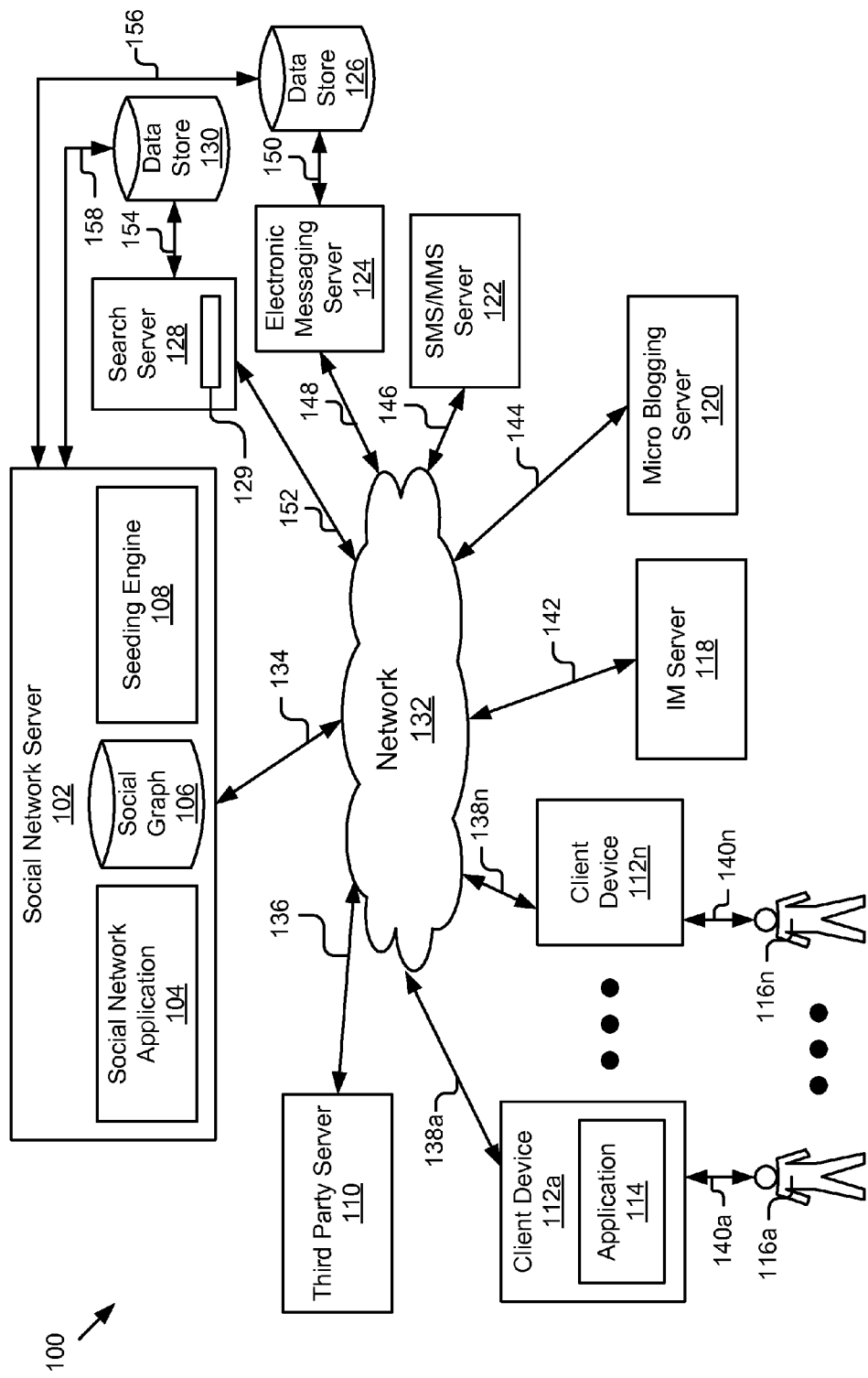
FIG. 1 is a block diagram illustrating an example system for seeding user connections in a social network.

FIG. 1 is a block diagram illustrating an example system 100 for seeding user connections in a social network. In the depicted implementation, the system 100 includes a social network server 102; a third party server 110; client devices 112a . . . 112n (also referred to herein individually and collectively as 112) that are accessible by users 116a . . . 116n (also referred to herein individually and collectively as 116); an Instant Messaging (IM) server 118; a micro blogging server 120; a Short Message Service (SMS)/Multimedia Messaging Service (MMS) server 122; an electronic messaging server 124; and a search server 128. In the depicted implementation, the entities 102, 110, 112a . . . 112n, 118, 120, 122, 124, and 128 are electronically communicatively coupled via a network 132. The system 100 illustrated in FIG. 1 is representative of an example system for seeding user connections in a social network, and it should be understood that a variety of different system environments and configurations may be employed and are within the scope of the present disclosure. Other implementations may include additional or fewer computing devices, services, and/or networks. Further, while the present disclosure is described above primarily in the context of activities related to social networking, it is applicable to any type of electronic communication within or between entities of a network.

In some implementations, the entities of the system 100 may use a cloud-based architecture where one or more computer functions or routines are performed by remote computing systems and devices at the request of a local computing device. For example, a client device 112 may be a computing device having a limited set of hardware and/or software resources and may access hardware and/or software resources provided across the network 132 by other computing devices and resources, including, for instance, other client devices 112, the social network server 102, the third party server 110, the electronic messaging server 124, the search server 128, or any other entities of the system 100. A client device 112 may access these resources through an access program, including, for example, the user application 114. This access program may include, for example, a web browser or another native program operating on the device for sending and receiving information via a network, and the results of any computer functions or resources may be delivered to the user of the client device 112 via the access program. User interfaces of one such example access program are further described below with reference to at least FIGS. 6 and 7. In some implementations, the social network server 102, the electronic messaging server 124 or any other entity of the system 100 may be a cloud-based, distributed computing system having dynamically scalable and virtualizable resources, and various functionality of the social network server 102, the social network application 104, the electronic messaging server 124, the data stores 124 and 128, and/or any data, data storage, software or software routine may be processed and supplemented by computing systems and devices distributed over the network 132.

As depicted in FIG. 1, the social network server 102, the third party server 110, the IM server 118, the micro blogging server 120, the SMS/MMS server 122, the electronic messaging server 124, and the search server 128 are respectively coupled to the network 132 via signal lines 134, 136, 142, 144, 146, 148, and 152, for interaction with each other and the other components of the system 100. The social network server 102, the third party server 110, the IM server 118, the micro blogging server 120, the SMS/MMS server 122, the electronic messaging server 124, and the search server 128 may be a computing device having one or more processors and one or more storage devices storing data or instructions for execution by the one or more processors. For example, a computing device may be a hardware server, a server array or any other computing device, or group of computing devices, having data processing, storing and communication capabilities. The computing device may also be a virtual server (i.e., a virtual machine) implemented via software. For example, the virtual server may operate in a host server environment and accesses the physical hardware of the host server including, for example, a processor, memory, storage, network interfaces, etc., via an abstraction layer (e.g., a virtual machine manager). It should be understood that any of the entities of the system 100 can be stored in any combination of devices and servers or in one device or server.

In the depicted implementation, the social network server 102 includes a social network application 104, a social graph 106, and a seeding engine 108. The social network application 104 cooperates with the social graph 106 to provide functionality for a social networking service (also referred to as a social network) and the seeding engine 108 cooperates with the social network application 104 to seed user connections for newly registered users in the social network. Additional structure and functionality of the social network application 104, the social graph 106, and the seeding engine 108 are further described below with reference to at least FIG. 2.

While only the social network server 102 is depicted in FIG. 1 as including a seeding engine 108, it should be understood that this implementation is provided by way of example and that any single entity or any number of entities may include an instance of the seeding engine 108. For example, the electronic messaging server 124 or the third party server 110 could store and operate an instance of the seeding engine 108, and provide access to the functionality of it to the other entities of the system 100 via an application programming interface (API). Additional structure and functionality of the seeding engine 108 is further described below with reference to at least FIG. 2.

The third party server 110 is a computing device or system for providing various computing functionalities, services, and/or resources to the other entities of the system 100. In some implementations, the third party server 110 is a server hosting a network-based software application operable to provide the computing functionalities, services, and/or resources, and to send data to and receive data from the other entities of the network 132. For example, the third party server 110 may operate a software application for managing a federated account and identity; blogging; social networking; micro blogging; photo management; video, music and multimedia hosting, distribution, and sharing; business services; news and media distribution; or any combination of the foregoing services. It should be understood that the third party server 110 is not limited to providing the above-noted services and may include any other network-based or cloud-based service, including, for example, those provided by the other entities of the system 100. For simplicity, a single block for the third party server 110 is shown in FIG. 1. However, in this or other implementations, several distinct third party servers (not shown) may be coupled to the network via distinct signal lines which operate applications providing distinct or competing functionalities and/or resources.

The client devices 112a . . . 112n are computing devices having data processing and data communication capabilities. In the depicted implementation, the client device 112a is coupled to the network 132 via signal line 138a, and the user 116a's interactions with client device 112a are depicted by line 140a; and the client device 112n is coupled to the network 132 via signal line 138n, and the user 116n's interactions with the client device 112n are depicted by line 140n.

In some implementations, a client device 112 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In other implementations, different client devices 112a . . . 112n include different types of computing devices. For example, the client device 112a is a laptop and the client device 112n is a tablet computer. In some implementations, the client device 112 is a handheld wireless computing device which is capable of sending and receiving voice and/or data communications.

The client device 112 may include a computer processor, a memory, a power source, and a communication unit including one or more network interfaces for interacting with the network 132, including, for example, wireless transceivers to broadcast and receive network data via radio signals. The client device 112 may also include one or more of a graphics processor; a high-resolution touchscreen; a physical keyboard; forward and rear facing cameras; sensors like accelerometers and/or gyroscopes; a GPS receiver; a Bluetooth® module; memory storing applicable firmware; and various physical connection interfaces (e.g., USB, HDMI, headset jack, etc.); etc. Additionally, an operating system for managing the hardware and resources of the client device 112, application programming interfaces (APIs) for providing applications access to the hardware and resources, a user interface module for generating and displaying interfaces for user interaction and input, and applications including, for example, applications for making phone calls, video calls, web browsing, messaging, social networking, gaming, capturing digital video and/or images, etc., may be stored and operable on the client device 112. While FIG. 1 illustrates two or more client devices 112, the present disclosure applies to any system architecture having one or more client devices 112.

In the depicted implementation, the client device 112a contains a user application 114 executable by a processor (not shown) of the client device 112 to provide for user interaction, and to send and receive data via the network 132. In particular, the user application 114 is operable to instruct the client device 112 to render user interfaces, receive user input, and send information to and receive information from the social network server 102 and the other entities of the system 100. While in the depicted implementation, just the client device 112a is depicted as including the user application 114, any number of client devices 112 may include an instance of the user application 114. In some implementations, the user application 114 is client code operable in a web browser. In these or other implementations, the user application 114 is stored in a memory (not shown) of the client device 112a and is accessible and executable by a processor (not shown).

In some implementations, the user application 114 generates and presents user interfaces to the user 116a via a display (not shown). For example, the user application 114 may generate and present the user interfaces 600 and 700 depicted in FIGS. 6 and 7, respectively, based at least in part on information received from the social network server 102 via the network 132. In some implementations, the user application 114 is code operable in a browser launched on the client device 112a, the browser receives interface instructions from the social network application 104 or the seeding engine 108 of the social network server 102 via the network 132 in the form of a mark-up language (e.g., HTML, XML, etc.), style sheets (e.g., CSS, XSL, etc.), graphics, and/or scripts (e.g., JavaScript, ActionScript, etc.), and the browser interprets the interface instructions and renders an interactive Web User Interface (WUI) for display on the client device 112a based thereon. In other implementations, some or all of the interface instructions are provided by the user application 114 while the substantive information is provided by the social network server 102. Other variations are also contemplated and within the scope of this disclosure. The user application 114 is also operable to receive input signals from the user 116a via an input device (not shown) of the client device 112a, and to send information to the social network application 104 and the seeding engine 108 via a communication unit (not shown) (e.g., one like or substantially similar to the communication unit 218).

The IM server 118 and the SMS/MMS server 122 are computing devices for sending, receiving, and/or relaying messages between client devices 112. The IM server 118 and/or the SMS/MMS server 122 may cooperate with client software operable on the client devices 112 to generate messages including textual, graphical, and audio and/or video data based on user input and send the messages to the designated recipient client devices 112. In some implementations, the client devices 112 are handheld wireless devices coupled to a transceiver node of a mobile network included in the network 132 via a control, voice, and/or data channel to send and receive messages. In some examples, the messages sent via the IM server 118 may be sent, at least in part, via Extensible Messaging and Presence Protocol (XMPP), Session Initial Protocol (SIP), Internet Relay Chat (IRC) protocol, hypertext transfer protocol (HTTP), hypertext transfer protocol secure (HTTPS), etc., and the messages sent via the SMS/MMS server 122 may be sent via short messaging service (SMS), multimedia messaging service (MMS), eXtended Messaging Service (XMS), wireless access protocol (WAP), etc.

The electronic messaging server 124 is a computing device for sending, receiving, managing, and providing access to electronic mail messages. While not depicted, the electronic messaging server 124 may include an electronic message application operable to send, store, receive, manage, and provide access to the electronic mail messages. In the depicted implementation, the electronic messaging server 124 stores electronic mail messages received, composed, saved, and/or sent by users in a data store 126. The data store 126 is an information source for storing and providing access to electronic message-related information. In some implementations, the electronic messaging server 124 and/or the social network server 102 can manipulate, i.e., store, query, update, and/or delete data, information stored by the data store 126 using programmatic operations. In some implementations, the data store 126 includes a database management system (DBMS) operable on the electronic messaging server 124 or another computing device and storable in a memory thereof (not shown). For example, the DBMS could be a structured query language (SQL) DBMS. In these implementations, information stored in the DBMS is stored in multi-dimensional tables comprised of rows and columns, and can be manipulated, i.e., inserted, queried, updated and/or deleted using programmatic operations (e.g., SQL queries and statements).

The seeding engine 108 may cooperate with the electronic messaging server 124 to retrieve message-related information including, for example, electronic mail messages and information describing the electronic mail messages, from the data store 126. For example, the seeding engine 108 may signal the electronic messaging server 124 to aggregate electronic mail messages which contain various information and provide the messages and/or information to the seeding engine 108. In other implementations, the data store is accessible by both the seeding engine 108 and the electronic messaging server 124, and the seeding engine 108 may directly access and query the data store 126 for electronic mail messages containing various information. In some implementations, the electronic messaging server 124 may transmit electronic mail messages and/or information about the messages between any of the constituent elements of the system 100. In some implementations, electronic mail messages are transmitted by the electronic messaging server 124 and other elements of the system 100 over the network 132 using protocols including, for example, transmission control protocol/Internet protocol (TCP/IP), HTTP, HTTPS, internet message access protocol (IMAP), simple mail transfer protocol (SMTP), post office protocol (POP), Webdav, etc. While only one electronic messaging server 124 is depicted, any number of electronic messaging servers 124 could be included in the system 100.

In the depicted implementation, the search server 128 includes a search engine 129 for retrieving results that match search terms from the Internet. The search server 128 may be a server, server array or any other computing device, or group of computing devices, having data processing, storing, and communication capabilities. The other entities of the system 100 may interact with the search engine 129 via the network 132 to retrieve the results matching various search terms provided to the search engine 129. For example, the seeding engine 108 may signal the search engine 129 to provide search results matching a particular person's name. This person may be an individual being invited to join the social network by the invitation module 206, as discussed further below with reference to at least FIG. 2. For example, an unregistered user's name could be provided as a search term, and the top hits for that user's name could be provided by the search server 128 to the seeding engine 108. Although, only one search server 128 is shown, it should be understood that multiple search servers 128 may be included in the system 100.

The data store 130 is an information source that stores and provides access to an indexed copy of the network-based and network-accessible content hosted by the entities coupled to the network 132. In some implementations, the information stored in the data store 130 is retrieved and stored in part by a web crawler. In some implementations, the data stored in the data store 130 can be accessed via the search server 128, as discussed above. In other implementations, the data stored in the data store 130 can be accessed directly. For example, in the depicted implementation, the social network server 102, the social network application 104, and/or the seeding engine 108 can access the data stored in the data store 130 directly via signal line 158.

The network 132 is a network for interconnecting computing nodes. The network 132 may have any number of configurations or topologies. For example, the network 132 may have a star, token ring, or other known topology or hybrid thereof. The network 132 may include a local area network (LAN), a wide area network (WAN) (e.g., the Internet), and/or any other interconnected data path across which multiple devices may communicate. The network 132 may be coupled to or include a mobile (cellular) network including distributed radio networks and a hub providing a wireless wide area network (WWAN), or other telecommunications networks. In some implementations, the network 132 may include Bluetooth® communication networks for sending and receiving data. The network 132 may transmit data using a variety of different communication protocols including, for example, various Internet layer, transport layer or application layer protocols. For example, the network 132 may transmit data using user datagram protocol (UDP), transmission control protocol (TCP), HTTP, HTTPS, file transfer protocol (FTP), WebSocket (WS), WAP, IMAP, SMTP, POP, SMS protocol, MMS protocol, XMS protocol, or other known protocols. Client devices 112 may couple to and communicate via the network 132 using a wireless and/or wired connection. In some implementations, the client devices 112 include a wireless network interface controller for sending and receiving data packets to an access point of the network 132. For example, the client devices 112 may be Wi-Fi™ enabled devices which connect to wireless local area networks (WLANs), including, for example, wireless hotspots, included in the network 132. The client devices 112 may also include one or more wireless mobile network interface controllers for sending and receiving data packets via a WWAN of the network 132.

The entities 102, 110, 118, 120, 122, 124, and/or 128 may require users to register for a user account to access various functionalities and services provided by these entities. For example, to register, a credential module included in and operated a given entity of the system may require a user 116 to provide identifying information, for example, a valid electronic mail address and password, and the application may test the validity of the electronic mail address by sending the a confirmation message to the address containing instructions for confirming the account (e.g., selecting a hyperlink to a confirmation webpage operated by the service provider). Once registered, the credential module may require a user seeking access to the service operated by this entity to authenticate by inputting the identifying information in an associated user interface.

Figure 2:
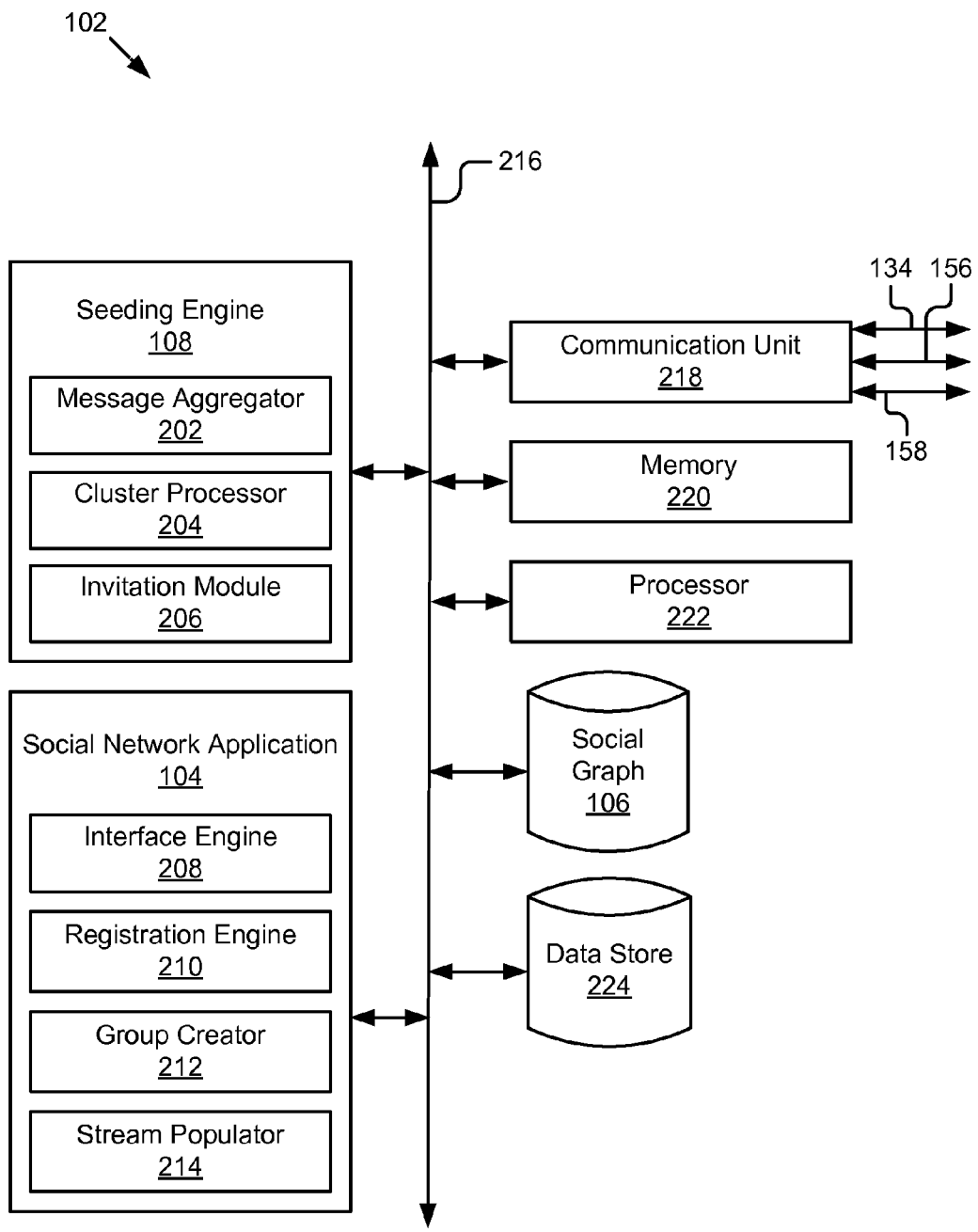
FIG. 2 is a block diagram illustrating an example social network server.

FIG. 2 is a block diagram of an example social network server 102. In the depicted implementation, the social network server 102 is a computing device which includes the social network application 104, the social graph 106, the seeding engine 108, a processor 222, a memory 220, a communication unit 218, and a data store 224. In the depicted implementation, the components 106, 218, 220, 222, and 224 are communicatively coupled via a bus 216. In various implementations, the social network application 104, the seeding engine 108, and their respective sub-components 202, 204, 206, 208, 210, 212, and 214 may be sets of instructions stored in the memory 220 and executable by the processor 222 for communication with the other components of the social network server 102; may be implemented via one or more application specific integrated circuits (ASICs) coupled to the bus 216 for cooperation and communication with the other components of the social network server 102; sets of instructions stored in one or more discrete memory devices (e.g., a PROM, FPROM, ROM) that are coupled to the bus 216 for cooperation and communication with the other components of the social network server 102; a combination thereof; etc.

The bus 216 can include a conventional communication bus for transferring data between components of a computing device or between computing devices, a network bus system including the network 132 or portions thereof, a processor mesh, a combination thereof, etc. In some implementations, the social network application 104, the seeding engine 108, and their respective sub-components 202, 204, 206, 208, 210, 212, and 214, and various software operating on the social network server 102 (e.g., an operating system) may cooperate and communicate via a software communication mechanism implemented in association with the bus 220. The software communication mechanism can include and/or facilitate, for example, inter-process communication, local function or procedure calls, remote procedure calls, an object bus (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The social network server 102 depicted in FIG. 2 is provided by way of example and it should be understood that the social network server 102 may take other forms and include additional or fewer components without departing from the scope of the present disclosure. For example, while not shown, in some implementations, the social network server 102 may include input and output devices (e.g., a computer display, a keyboard and mouse, etc.), various operating systems, sensors, additional processors, and other physical configurations. Additionally, it should be understood that the computer architecture depicted in FIG. 2 is applicable to the other entities of the system 100 with various modifications. For example, the third party server 110, the IM server 118, the micro blogging server 120, the SMS/MMS server 122, the electronic messaging server 124, and/or the search server 128 could have the same or a similar architecture as the social network server 102 depicted in FIG. 2, including, for instance, the processor 222, the memory 220, the communication unit 218, and a data store 224 coupled via a bus 216.

The communication unit 218 may be a network interface device (I/F) which includes ports for wired connectivity. For example, the communication unit 218 may include a CAT-5 interface, USB interface, and/or SD interface, etc. The communication unit 218 may link the processor 222 to the network 132 that may in turn be coupled to other processing systems. The communication unit 218 may provide connections to the network 132 and to other entities of the system 100 using standard communication protocols including, for example, those discussed with reference to the network 142. In some implementations, the communication unit 218 includes a transceiver for sending to and receiving wireless signals from the network 132 using Wi-Fi, Bluetooth®, cellular communications, etc. In the depicted implementation, the communication unit 218 is coupled to the network 132 via signal line 134 for communication and interaction with the other entities of the system 100, and is coupled to data stores 126 and 130 via signal line 156 and 158, respectively, for direct communication and interaction with those entities.

The memory 220 stores instructions and/or data that may be executed by the processor 214. In the depicted implementation, the memory 220 stores at least the social network application 104 and the seeding engine 108. The memory 220 is also capable of storing other instructions and data, including, for example, an operating system, hardware drivers, other software applications, databases, etc. The memory 220 is coupled to the bus 220 for communication with the processor 214 and the other components of social network server 102. The instructions and/or data may include code for performing any and/or all of the techniques described herein. In particular, the memory 220 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 214. A non-transitory computer-usable storage medium may include any and/or all computer-usable storage media. In some implementations, the memory 220 may include volatile memory, non-volatile memory, or both. For example, the memory 220 may include one or more of a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, and any other mass storage device known for storing information on a more permanent basis. It should be understood that the memory 220 may be a single device or may include multiple types of devices and configurations.

The processor 222 includes an arithmetic logic unit, a microprocessor, a general purpose controller, or some other processor array to perform computations and provide electronic display signals to a display device (not shown). The processor 222 may be coupled to the bus 216 for communication with the other components of the social network server 102. The processor 222 may process data signals and may have various computing architectures including a complex instruction set computer (CISC) architecture, a reduced instruction set computer (RISC) architecture, or an architecture implementing a combination of instruction sets. Although only a single processor 222 is shown in FIG. 2, multiple processors may be included and each processor may include a single processing core or multiple interconnected processing cores. The processor 222 may be capable of supporting the display of images and the capture and transmission of images, perform complex tasks, including various types of feature extraction and sampling, etc.

A social network is any type of social structure where the users are connected by one or more common features. The common features can include any attribute, interest, preference, or interaction attributable to the users. For example, the common features include relationships/connections, e.g., professional and academic attributes and interests, friendships, familial ties, etc. The common features can also include explicitly-defined relationships and relationships implied by social connections with other online users and entities. The common features can be provided by one or more social networking systems, including, for example, those included in the system 100. In some implementations, the common features are derived from the users' user profiles stored in one or more information sources associated with these social networking systems. A user's user profile can include information specific to that user like personal information, professional information, and interaction data reflecting the user's activity on the social network. For example, the personal information may describe where a user lives, the user's hobbies, relationship status, gender, age, biographical information, etc.; the professional information may describe a user's professional experience and qualifications (e.g., employment history, job title, skills and certifications, education, etc.); and the social network activity may describe a user's content stream posts including content submissions, notifications, messages, comments, positive or negative endorsements for various content posted by other users, etc. Common features between the personal information, professional information, and social network activity of the users can be mapped by the social network application 104 to connect the users.

In situations in which the systems discussed here collect personal information about users, or may make use of personal information, the users may be provided with an opportunity to control whether programs or features collect personal information (e.g., information about a user's social network, social actions or activities, profession, a user's preference, or a user's location), or to control whether and/or how to receive content from a social network server that may be more relevant to the user. In addition, certain data may be treated in one or more ways before it is stored or used, so that personal identifiable information can be determined for the user, or a user's geographic location may be generalized where location information is obtained (such as to a city, ZIP code, or state level), so that a particular location of a user cannot be determined. Thus, the user may have control over how information is collected about the user and used by a social network server.

Each individual user's relationships and connections with other users and entities, explicit or implicit, form a social graph for that user. For example, a user's social graph may include social graph connection information describing connections between that user and the other users of the social network; what common features, attributes, interests, social network activity, etc., connect that user to other users; any groups/sets formed by that user and/or the social network application 104 to categorize or group his or her connections on the social network; the strength of the connections between the user and other users, which can be calculated based on, for example, the degree or degrees (e.g., 1st, 2nd, 3rd, 4th, etc.) of separation between the user and other users, who, if any, the connecting/interstitial users are; the amount or type of interactions between the users, etc.; etc. For instance, the social network application 104 and/or a user (e.g., via an associated user interface), may define groups for users who are work friends, school friends, networking contacts, clients, etc., and user's the social graph may include data reflecting what groups these users belong to. Together, the social graphs of the users form a collective social graph that reflects a mapping of all of the users of the social network and how they are related.

In the depicted implementation, the social graph 106 is an information source for storing and providing access to organized collections of data associated with the social network. In particular, the social graph 106 can store, manage and provide access to the information connecting the users of the social network, including the social graph information, information describing the common features connecting the users the social network, user profile information, etc. The social network application 104, the seeding engine 108, and the other entities of the system 100 can cooperate with the social graph 106 to manipulate this information, i.e., insert, query, update, and/or delete, rows of data using programmatic operations. In some implementations, the information stored by the social graph 106 is stored in the memory 220 of the social network server 102. In other implementations, the social graph 106 is included in a memory, computing device and/or storage system distinct from but accessible by the social network server 102. In various implementations, the social graph 106 stores records, files, objects, data, etc., in cooperation with a file system executable by the processor 222. The social graph 106 may additionally or alternatively include a database management system (DBMS) executable by the processor 222 to manage a collection of records, files, objects, etc. For example, the database could be a structured query language (SQL) DBMS and the data could be manipulated using SQL queries and statements.

The seeding engine 108 is software, code, logic, or routines for cooperating with the social network application 104 to seed a cluster of associated users that have just registered to use the social network with connections to one another and/or other users. Among other functionalities, the seeding engine 108 can aggregate message-related information belonging to a given user; identify one or more social clusters using information from the message-related information; generate and provide summaries of the one or more social clusters for selection; receive a selection of one or more social clusters; invite users belonging to the one or more selected social clusters that are not registered members of the social network to join, and generate and provide summaries describing the status of pending invitations. In various implementations, the seeding engine 108 can aggregate message-related information from various information sources and then identify the social clusters based on the aggregated information or can access the message-related information from various information sources real-time to identify the social clusters.

As depicted in FIG. 2, the seeding engine 108 includes a message aggregator 202, a cluster processor 204, and an invitation module 206. The social network server 104 includes an interface engine 208, a registration engine 210, a group creator 212, and a stream populator 214. These components 202, 204, 206, 208, 210, 212, and 214 cooperate to provide the functionality described herein. However, the arrangement illustrated in FIG. 2 is provided by way of example, and it should be understood that other arrangements are possible. For example, an alternative arrangement could combine the functionality of one or more of the components 202, 204, 206, 208, 210, 212, and 214 into a single module or engine, integrate the seeding engine 108 into other software applications (e.g., the social network application 104), or vice versa, or further divide the modules into separate additional cooperative components.

In the depicted implementation, the components 202, 204, 206, 208, 210, 212, and 214 are electronically communicatively coupled for cooperation and communication with each other, the social network application 104, the seeding engine 108, the communication unit 218, the memory 220, the processor 222, and/or the data store 224. The seeding engine 108 and its sub-components 202, 204, and 206, and the social network server 104 and its sub-components 208, 210, 212, and 214 are also coupled for communication with the other entities 102, 110, 112a ... 112n, 118, 120, 122, 124 and 128 of the system 100 via the network 132. For example, the seeding engine 108 can interact (e.g., via an API) with the electronic messaging server 124, the SMS/MMS server 122, the micro blogging server 120, the IM server 118, and/or the third party server 110 to access, query and/or aggregate information about electronic messages managed by these computing devices. In this example, the seeding engine 108 can interact with a credential module (not shown) associated with these computing devices to authenticate users 114 seeking access to the functionality of the seeding engine 108, and to provide the seeding engine 108 access to information and functionality of these computing devices. In further example, the seeding engine 108 can access, query and/or aggregate information related to the electronic messages stored in the data store 126 either directly via signal line 156 or by interacting with the electronic messaging server 124 via the network 132.

In some implementations, the social network server 104, the seeding engine 108, the message aggregator 202, the cluster processor 204, the invitation module 206, the interface engine 208, the registration engine 210, the group creator 212, and/or the stream populator 214 are sets instructions executable by the processor 222, or logic included in one or more customized processors, to provide their respective functionalities. In various other implementations, the social network server 104, the seeding engine 108, the message aggregator 202, the cluster processor 204, the invitation module 206, the interface engine 208, the registration engine 210, the group creator 212, and/or the stream populator 214 are stored in the memory 220 of the social network server 102 and are accessible and executable by the processor 222 to provide their respective functionalities. In any of these implementations, the social network server 104, the seeding engine 108, the message aggregator 202, the cluster processor 204, the invitation module 206, the interface engine 208, the registration engine 210, the group creator 212, and/or the stream populator 214 are adapted for cooperation and communication with the processor 222 and other components of the social network server 102.

The message aggregator 202 is software, code, logic, or routines for aggregating message-related information from one or more information sources that store electronic messages associated with one or more users. The message-related information may include the electronic messages themselves or any portion thereof, metadata associated with the messages, message summaries, etc. The electronic messages accessed by the message aggregator 202 may be any type or combination of electronic messages sent to users. For example, the electronic messages may include electronic mail messages managed by the electronic messaging server 124 and stored in the data store 126, instant messages stored by the instant message server 118, SMS, MMS or other similar text or multi-media messages stored by the SMS/MMS server 122, micro blogging posts stored by the micro blogging server 120, and social network posts added to a user's content stream stored in the data store 222, etc.

In some implementations, to aggregate the message-related information, the message aggregator 202 can search one or more information sources for electronic messages associated with a given user. The message aggregator 202 may be coupled via the communication unit 218 and the network 132 to search for electronic messages stored or managed by external information sources, including, for example, the third party server 110, the client devices 112a . . . 112n, the IM server 118, the micro blogging server 120, the SMS/MMS server 122, the electronic messaging server 124/data store 126, and the search server 128/data store 130. In these or other implementations, electronic messages may be stored in the data store 222, and the message aggregator 202 may search it for message-related information. In some implementations, the message aggregator 202 may cooperate/interact with an information source to search the messages maintained by the information source. For example, the message aggregator 202 may access and query the electronic messages stored and maintained by one or more information sources (e.g., 102, 110, 118, 120, 122, 124, 126, 128, 130 and 222) for message-related information matching various search criteria and patterns via an API. In other implementations, the message aggregator 202 may retrieve message-related information from one or more information sources (e.g., 102, 110, 118, 120, 122, 124, 126, 128, 130 and 222), and may store and search this information independently.

The message aggregator 202 can aggregate message-related information by searching the metadata and message body of the electronic messages for various information or types of information. The metadata may include various textual fields identifying the sender of the message, the recipient(s) of the message, the date and time the message was sent, the subject, etc. The message body may include any type of content for relaying a message. For example, the message body may include textual data, audio data, video data, graphical data, rich text, and/or presentational, procedural, and/or descriptive markup information. In some implementations, the message aggregator 202 may search the electronic messages for predetermined words, terms, keywords, phrases, or other content.

The message aggregator 202 can filter the message-related information being aggregated using one or more criteria. For example, the message aggregator 202 can search for messages of a given user that were distributed to a number of other users (e.g., 4 or more other people), that were forwarded or replied to, that relate to predetermined topics (e.g., a social event) or include certain keywords (e.g., vacation, wedding, game, dinner, etc.). In another example, the message aggregator 202 can also filter out messages associated with a given user that do not describe or are not related to multiple other users. As a further example, the message aggregator 202, can filter out messages addressed to a single or few recipients, messages that were never responded to, messages identified by the message aggregator 202 as spam or bacn, etc. Spam, also referred to as an unsolicited bulk message or junk message, and is generally a message sent to numerous recipient users who did not request or provide permission to receive the message. Bacn is an electronic message that has been subscribed to and therefore is not unsolicited, but is often disregarded by the recipient. Bacn differs from spam in that it was solicited in some way. For instance, bacn may be sent to a user by organizations or business entities because the user has a registered user account with those organizations or entities. The filtering performed by the message aggregator 202 is advantageous as it can reduce the number of messages/message-related information that need to be processed later by the cluster processor 204 to identify the clusters of socially related users, and thus reduce the amount of time need to perform the cluster processing. The cluster processor 204 is discussed in further detail below.

The message aggregator 202 can store the message-related information that was aggregated in a local repository (e.g., the data store 224) for access by the other entities of the social network server 102. The message aggregator 202 may also provide message-related information directly to the cluster processor 204, or the cluster processor 204 may retrieve the data from the data store 224. In some implementations, the message aggregator 202 may instruct the cluster processor 204 to process the message-related information by sending a processing signal to the cluster processor 204.

In some implementations, the message aggregator 202 can aggregate the message-related information in response to a seed request being received from an instance of the user application 114 operating on a client device 112, the social network application 104 or another element of the system 100. A seed request is a request for the seeding engine 108 to identify one or more clusters of users who can be seeded as connections for the user on the social network. For example, a user application 114 operating on a client device 112a may receive user input from a requestor/user 116b requesting a user interface summarizing the social clusters be presented. Upon receiving the user input, the user application 114 may generate and send the seed request. In other implementations, the message-related information may be automatically aggregated and stored in advance (e.g., at regular intervals), by the message aggregator 202 in cooperation with the electronic messaging server 124, the SMS/MMS server 122, the micro blogging server 120, and the IM server 118, etc., for the users that exchange messages via these computing device.

A seed request can be a request from a new user who is unregistered with the social network to join the social network or by a registered user of the social network. In some implementations, registration with the social network may be based on a join criterion or criteria and the registration engine 210 may restrict users from registering unless it determines the join criterion or criteria to be satisfied. As examples, to provide a new user with a satisfying and interactive experience upon joining the social network, the registration engine 210 may only register the new user if a predetermined number of other unregistered users join in connection with the new user; may only register the new user if a predetermined number of users who are members of the social network (i.e., already registered) consent to being directly connected to the new user in the social graph; may only register the new user if the number of unregistered users that join in connection with the new user and the number of members that consent to being directly connected to the user in the social graph have a combined total that equals a predetermined threshold, etc. This is advantageous as it can encourage new users to join the social network in connection with other users. In these examples, a seed request may be submitted by the new user requesting clusters of users that are socially connected with the new user be identified from the new users' electronic messages so the new user may invite the users of one or more of these clusters to join/connect on the social network.

In other examples, the seed request can be a request from an existing member of the social network seeking to establish relationships with other users (e.g., friends, family, acquaintances, co-workers), whether they be registered users of the social network or not. For example, the member may have a group of friends who are not registered users of the social network that the member frequently exchanges electronic messages with. The member, desiring to interact with those users on the social network, may submit a seed request and the cluster processor 204, in cooperation with the message aggregator 202, may surface a social cluster including those users for the member to invite to join the social network via the invitation module 206. It should be understood that, like all examples and implementations discussed herein, the above examples are non-limiting and other scenarios and configurations are also possible, contemplated, and fall within the scope of the present disclosure.

In some implementations, the seed request can include or be associated with an authentication token authorizing the message aggregator 202 and the cluster processor 204 to respectively aggregate and process/summarize the message-related information. In some implementations, the social network application 104, the electronic messaging server 124, and any of the other entities of the system 100 may authenticate users using a common credential module. For example, the common credential module may be implemented by a federated identity authentication service for authenticating users that is operated by the social network server 102, the electronic messaging server 124, the third party server 110, etc.

In some implementations, the message aggregator 202 may act as a controller for receiving the seed requests, and in response to receiving it, may aggregate the message-related information, and then signal the cluster processor 204 to perform its operations. In other implementations, the cluster processor 204 may act as the controller and may signal the message aggregator 202 to aggregate the message-related information by sending a signal to it, or may access the message-related information aggregated in advance by the message aggregator 202 from the data store 204. The seeding engine 108 or the social network application 104 may also alternatively or additionally include a discrete controller to handle the seed requests and signal the message aggregator 202, the cluster processor 204, and/or the invitation module 206 to perform their respective operations.

The cluster processor 204 is software, code, logic or routines for processing the message-related information aggregated by the message aggregator 202 to identify social clusters, rank the social clusters, and generate a social cluster summary describing the social clusters and providing it for presentation to a user. A social cluster is a grouping of users who have interacted socially with one another using electronic messages. In some implementations, the message-related information includes the electronic messages of a given user that were exchanged with other users, and the cluster processor 204 uses this information to determine identifying information for these other users. For example, the cluster processor 204 parses a user name, electronic mail address, user handle, phone number, or other identifier for each of these other users. This identifying information can then be passed to the invitation module 206 to send invitations to these users, as further discussed below with reference to the invitation module 206.

In some implementations, the cluster processor 204 can process the message-related information to surface the social clusters containing users that share a significant connection. The cluster processor 204 can process various attributes of the messages reflected by the message-related information to determine whether the users are significantly connected. These attributes may include the names of the users, organizations/entitles the users are affiliated with, the number of users the messages were distributed to, the length of the message threads that the messages belong to, the number of users that contributed to the conversation reflected by a message thread, the subject matter of the messages, keywords included in the messages, the number of times a message was forwarded or replied to, the number of times the same users (or substantially the same users) were included an electronic message distribution list, how current the messages are, etc. For example, the cluster processor 204 may determine users to be significantly connected if they have exchanged several messages about a particular topic, have exchanged messages regularly about a host of topics, share the same last name, belong to the same organization, etc. In a further example, the cluster processor 204 may determine a group of users who were sent a single message by a given user about a general topic, and to which no replies were received, to not be significantly connected.

Based on the attributes, the cluster processor 204 can suggest group names for the social clusters for use in the cluster summary, and in response to receiving the cluster summary the requestor can send input selecting which group name should be used to form a group with an invitation request inviting the users of one or more social clusters to join and/or connect on the social network. Invitation requests are further described below with reference to at least the invitation module 206. For example, the cluster processor 204 may use one or more keywords, a topic, an organization name, etc., to generate the suggestions for a group name. As a further example, the cluster processor 204 may suggest a group name of "Close Friends" for one or more social clusters because they had exchanged electronic messages about going on vacations together, dining together, planning get-togethers, etc., and the group creator 212 may correspondingly name the group being created "Close Friends" and tag the group with attributes including "vacation," "food," "social events," etc.

The cluster processor 204 can also rank the social clusters it identifies based on the above-noted processing. In some implementations, the processing performed by the cluster processor 204 ranks the social clusters based on how strongly connected the users of a social cluster are. For example, social clusters of users that, based on the electronic messages exchanged between them, are related or well-acquainted; engage in activities together (e.g., dinner, sporting events, etc.); frequently confer about various topics; share photographs, anecdotes, videos, etc.; or work together, are ranked higher by the cluster processor 204 relative to social clusters including users that are not connected in one or more of these ways. Additionally, in some implementations, the more ways the users of a social cluster are determined to be connected by the processing, the higher the cluster may be ranked by the cluster processor 204 relative to the other social clusters it identifies.

In some implementations, in response to a seed request being received, cluster processor 204 cooperates with the interface module 208 to generate and transmit a summary of the social clusters to a client device of the requestor for display. In some implementations, the summary of social clusters includes a description of the one or more social clusters identified by the cluster processor 204 and the users of each social cluster. The summary may also include information describing how the users of the social cluster are related. For example, the summary may describe the attributes that a social cluster is based on including what topics the users of the social cluster discussed when exchanging messages, whether the users appear to be related, whether the users belong to the same organizations, how many messages were exchanged between the users, etc. In implementations where the summary describes more than one social cluster, the summary may order the social clusters in order of rank and may include indicia of each cluster's rank (e.g., a score, a label, etc.). The summary may also include electronic links to invite the users of a social cluster to join the social network and/or join a group including the users of the cluster on the social network.

The users of a given social cluster may be registered users of the social network, may be unregistered users, or both. In some implementations, the cluster processor 204 may use the identifying information (e.g., an electronic message address, a user name, etc.) associated with each user, which was parsed from the message-related information by the cluster processor 204, to determine whether the users are registered or not. For example, the cluster processor 204 may provide the identifying information to the registration engine 210 and receive a response from the registration engine 210 indicating whether the users are registered or not. The cluster processor 204 can interact with the registration engine 210 directly or via an API. In these implementations, the summary can be generated to describe whether the users in the cluster are registered or not. In other implementations, the invitation module 206 can determine whether the users of a given social cluster are registered or not by cooperating with the registration engine 210 as further discussed herein.

The cluster processor 204 may store the results of the processing and ranking performed by it, including data describing the social clusters and the users included in the clusters in the data store 224 for use by the other components 104, 202, 206, 208, 210, 212, and 214 or may provide this information or portions thereof to these other components directly. In some implementations, a social cluster summary generated based on this information may be sent by the interface engine 208 for presentation to the user via user interfaces including, for example, the user interface described with reference to at least FIG. 6.

In some implementations, the cluster processor 204 may determine, for example, supplemental information about the users of a social cluster and use this information to perform the processing and ranking, and to generate the social cluster summary. In particular, the cluster processor 204 may connect to an information source to obtain additional information corresponding to the information parsed from or included in the message-related information. For example, the cluster processor 204 may retrieve a user's public profile information or public information about a user from the other entities 110, 118, 120, 122, 124, and/or 128 of the system 100. The cluster processor 204 may store the information obtained from these entities in the data store 224 in association with the identifying information derived from the message-related information for the user.

The invitation module 206 is software, code, logic, or routines for receiving an invitation request and generating and sending invitations to the users of the one or more social clusters described in the invitation request. An invitation request may include information describing the one or more social clusters selected by the requestor. For example, the invitation request may include an identifier by which the social cluster is indexed in the data store 222 and information describing what the name of the group to be created by the group creator 212 should be. The invitation request may also include information identifying a requestor. The invitation module 206 can act as a controller/request handler for receiving and acting upon the invitation requests it receives. In some implementations, responsive to receiving an invitation request, the invitation module 206 parses the invitation request for information describing the one or more social clusters selected by the requestor. Using the information describing one or more social clusters, the invitation module 206 can, in some implementations, retrieve information identifying the users of the one or more social clusters from the data store 224. Additionally or alternatively, the invitation request may include information identifying the users of the one or more social clusters, and the invitation module 206 can parse the invitation request for this information.

The invitation module 206 can identify whether the users of a given social cluster are registered. In some implementations, the invitation module 206 can use the registration information for each user of the social cluster stored in the data store 224 by the cluster processor 204. In other implementations, like the cluster processor 204, the invitation module 206 can determine whether the users of a social cluster are registered users of the social network by interacting with the registration engine 210 of the social network application 104. For example, the invitation module 206 may provide the identifying information stored in the data store 224 for these users to the registration engine 210 and receive a response from the registration engine 210 indicating whether the users are registered or not. The invitation module 206 can interact with the registration engine 210 directly or via an API.

The invitation module 206 can generate and send invitations to unregistered users inviting them to join the social network and/or to registered users inviting them to connect on the social network. For an unregistered user, the invitation can include information inviting the user to agree to join the social network and be connected to the other users of the social cluster and the requestor; information describing the other users that invitations were sent to; and/or information describing the join criterion/criteria that must be met in order for the users of the social cluster and/or the requestor to become registered users; etc. For a registered user, the invitation can include information inviting the user to agree to connect to the other users of the social cluster and the requestor; information describing the other users that invitations were sent to; and/or information describing the join criterion/criteria that must be met in order for the users of the social cluster and/or the requestor to become registered users. By way of illustration, if the social cluster contains unregistered users, the invitation to join can describe how many of these users must agree to join the social network before the requestor and the users who have agreed to join will be registered and connected on the social network. In another example, if the social cluster contains unregistered users and registered users, the invitations to these users may describe the users that are registered and the users that are not, and may further describe how many of the registered users must agree to connect and how many of the unregistered users must agree to join the social network before these actions are carried out by the registration engine 210 and/or the group creator 212.

In some implementations, the invitation module 206 can receive an invitation status request from a client device 112 requesting an invitation status report be generated about a given invitation request and provided to the client device 112 of the requestor. In these implementations, the invitation module 206 can act as the controller/request handler for receiving and acting upon the invitation status requests it receives. In other implementations, the registration engine 210 or a discrete controller (not shown) may act as the handler for the invitation status requests and may interact with the invitation module 206 and the interface engine 208 to generate and provide the invitation status report to the requestor.

In some implementations, the invitation status report can inform the requestor about whether the requirements/criteria associated with the invitation request have been met; the users that have been registered with the social network or connected to the newly registered users (as the case may be); when the invitation request was made; the name of the group to be created; the number of invitations that have been accepted so far; the number of invitations that still need to be accepted to satisfy the requirements/criteria of the request; etc. A non-limiting example of a user interface displaying the invitation status report is further described below with reference to at least FIG. 7.

The invitation status request may include data identifying the invitation request it corresponds to and the invitation module 206 can use this data to retrieve information about it. In some implementations, the invitation module 206 can retrieve a record for the invitation request from the data store 224. The record can include information describing the attributes and requirements of the invitation request, the social cluster(s), users associated with the request, the requestor, and/or any other information related to the request. The invitation module 206 can also access registration records for each of the users associated with the social clusters for additional information about the users and their registration status. In some implementations, the invitation module 206 can retrieve this information from the data store 224. In other implementations, the invitation module 206 can interact with the registration engine 210 (e.g., via an API) to retrieve this information. The invitation module 206 can use the information included in the registration records to confirm whether any users who were previously identified as unregistered by the cluster processor 204 or the invitation module 206 are still unregistered, have requested to join the social network in response to receiving an invitation, etc.

Further, the invitation module 206 can access information either stored in the data store 224 by the group creator 212 or provided directly by the group creator (e.g., via an API) that identifies whether any registered users who were invited to connect with the other users of the social cluster and/or the requestor have agreed to do so by completing the instructions included the invitation (e.g., selecting a confirmation uniform resource locator (URL) referencing the group creator 212). Any of the above-noted information retrieved by the invitation module 206 can then be processed and/or included in the invitation status report.

The invitation module 206 can remind/re-invite users to accept/act on the invitations received by them. In some implementations, the invitation module 206 receives a reminder request instructing the invitation module to remind one or more users to accept previously sent invitations, and the invitation module 206, responsive to receiving the reminder request, generates and sends reminders to the one or more users. In other implementations, the invitation module 206 can autonomously send the reminders at periodic intervals (weekly, bi-weekly, monthly, etc.). The invitation module 206 can generate and send reminders in the same or substantially similar way that the invitations are generated and sent. The reminders can include the same information as the invitations, information about when the invitations may expire, the acceptance status of the other users who received invitations, any of the information includable in an invitation status report, etc.

In some implementations, the invitation module 206 interacts with the interface engine 208 to format and/or send the invitations, reminders, and invitation status reports. In other implementations, the invitation module 206 formats and sends the invitations, reminders, and invitation status reports independently via the communication unit 218 and the network 132. Further, the invitation module 206 can store any information associated with receiving and processing the invitation requests, generating and sending the invitations and reminders, and generating and sending the invitation status reports in the data store 224 for later access by the invitation module 206 or the other components 104, 108, 202, 204, 208, 210, 212 and/or 214 of the social network server 102. Additionally or alternatively, the invitation module 206 may provide this information directly to other components 104, 108, 202, 204, 208, 210, 212, and/or 214 of the social network server 102.

The interface engine 208 is software, code, logic, or routines for preparing and providing information to one or more of the other entities of the system 100 via the network 132. In some implementations, the interface engine 208 may process and send the information upon receiving a signal from another component 202, 204, 206, 210, 212, and/or 214. In some implementations, a signal may be received from the cluster processor 204 instructing the interface engine 208 to provide a cluster summary to a client device 112. In other implementations, a signal may be received from the invitation module 206 instructing the interface engine 208 to provide invitations or an invitation status report to a client device 112 for presentation. In yet other implementations, the registration engine 210, the group creator 212, and/or the stream populator may signal the interface engine 208 to provide the summaries and information generated by these components to various client devices 212 via the network 132 for presentation.

The information sent by the interface engine 208 may be processed by the interface engine 208 to include presentational information and the user application 114 may use the presentational information to form the look and feel of a user interface and then present the information to a user 126 via the user interface. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the user application 114 may interpret the interface instructions and render an interactive Web User Interface (WUI) for display on a user device 116 based thereon. Various example interfaces are described below with reference to at least FIGS. 6 and 7. In other implementations, the user application 114 may determine the formatting and look and feel of the user interfaces independently. Using the user interfaces presented by the user application 114, the user can input commands selecting various user actions. For example, using these interfaces users transmit a seed request, an invitation request, a request to remind a user to accept an invitation, etc.

The interface engine 208 may be coupled to the message aggregator 202, the cluster processor 204, the invitation module 206, the registration engine 210, the group creator 212, and the stream populator 214 to receive information generated or processed by these components. In some implementations, the interface engine 208 may retrieve information from the memory 216, the data store 224, and/or the social graph 106 that was stored by these components or is supplemental to information stored by these components.

The registration engine 210 is software, code, logic, or routines for registering user accounts for the new users, updating the social graph 106 with profile information for the new users, and connecting users. In some implementations, the registration engine 210 receives and processes registration requests. A registration request may include information about the unregistered user seeking to join the social network. For example, the registration requests may include the user's full name, user identifier (e.g., an electronic mail address, phone number, username, etc.), password, biographical information, personal information, and/or professional information, etc.

In some implementations, responsive to receiving a registration request, the registration engine 210 may determine whether the user is authorized to be registered. For example, if the registration engine 210 received a registration request from a user who was sent an invitation to join the social network by the invitation module 206, the registration engine 210 may verify whether one or more join criteria associated with the invitation request have been satisfied prior to proceeding to register the user. A join criterion can require a certain number of unregistered users associated with a social cluster to request to join the social network by submitting a registration request; can require a certain number of currently registered users associated with a social cluster to agree to connect with the other users of the social cluster; can be a combination of the foregoing, can require the users of the social cluster respond to receiving the invitation by certain date; etc.

To register a user, the registration engine 210 may create a user account for the user based on the information included in the request and update the social graph 106 with the profile information for the user. The registration engine 210 may generate explicit connections to other users in the social graph by defining social graph connection information in the social graph 106 that includes social graph connections between the user and the other users. In some implementations, the registration engine 210 defines the social graph connection information by generating and storing it in the social graph 106. In some implementations, the registration engine 210 may cooperate with the group creator 212 to create a group on the social network from the users of a given social cluster that have requested to join the social network. For example, the registration engine 210 can determine whether the registration requirements (i.e., join criteria) associated with an invitation request are satisfied, register the users associated with the social cluster who requested to be registered with the social network, and can signal the group creator 212 to store information reflecting a group in the social graph that includes those users.

The registration engine 210 may interact with the other components 104, 108, 202, 204, 206, 208, 212 and 214 of the social network server 102. For example, the registration engine 210 may provide registration and profile information about a given user or users to these other entities via an API. The registration engine 210 may be coupled to the data store 224 and the social graph 106 to store, modify, and access the registration and profile information.

The group creator 212 is software, code, logic, or routines for creating groups of users in the social graph 106 based on one or more common features shared by the users. In some implementations, a user, using an associated interface displayed by the user application 114, can transmit instructions to the group creator 212 to define groups to organize the users he or she is connected with on the social network. For example, the user can define a group to include family members, a group to include friends, a group to include college buddies, a group to include users of the social network who share his interest in photograph, etc. In other implementations, the group creator 212 can automatically create groups on behalf of the users. For example, based on the requirements of invitation request having been satisfied, the group creator can create a group from the users of the social cluster of users who accepted their respective invitations. As described elsewhere herein, the requestor and other users of the social cluster that accepted their invitations could have been already registered users of the social network at the time of the invitation request, could have been unregistered users of the social network, or could have been a mix of unregistered and registered users.

The group creator 212 can automatically create the group using the group name cooperatively determined by the cluster processor 204 and the invitation module 206. As previously described, in some implementations, the cluster processor 204 can determine how the users associated with one or more social clusters are connected based on the attributes it identifies and provide group name suggestions in the cluster summary presented to the requestor. In response, the requestor may select one of the suggested group names or define a different name for the group and provide it to the invitation module 206 in the invitation request along with his or her selection of social cluster(s). The group creator 212 can access the group name associated with the invitation request stored by the invitation module 206, as well as the attributes stored by the cluster processor 204, from the data store 224 or directly from the invitation module 206 and the cluster processor 204, respectively. In other implementations, group name suggestions can be generated and provided to the requestor of the invitation request via the network 132 at the time the group is being created by the group creator 212 and the requestor can select or define the name at that time. In these or other implementations, the group creator 212 may interact with the cluster processor 204 to receive group name suggestions, or may generate the group name suggestions independently in a manner that is the same or substantially similar to the cluster processor 204. To create the group, the group name and any attributes can be stored in the social graph by the group creator 212 in association with the users of the group as social graph information.

The stream populator 214 is software, code, logic, or routines for populating the content stream of one or more users with the posts of other users of the social network. A post included in a content stream by the stream populator 214 can include one or more of text, graphics, video, and audio. For example, a user that belongs to a group newly formed from a social cluster by the group creator 212 can submit a post by submitting a hyperlink (URL) or embed code for an online video he or she endorses, make a comment about another user's post, upload photographs from his/her client device, provide a positive or negative endorsement of another user's post, send a message, etc., and the stream populator can populate the content stream of the other users of the newly formed group with the post.

In some implementations, the stream populator populates the content streams of the users of the social cluster who accepted their respective invitations with one another's posts once they have been registered as users of the social network 102 by the registration module 210 and/or formed into a group by the group creator 212. In implementations where a group newly formed from one or more social clusters by the group creator 212 includes users who were already registered members at the time of the seed request and users who were not, the stream populator 214 can populate the content stream of the users who were not with historical posts submitted by the users who were. This is provides numerous advantages including creating an environment in the social network that is comfortable and familiar for newly registered users and providing these users at the outset with an interactive and rich experience on the social network.

The data store 224 is information source for storing and providing access to information including, for example, message-related information, user-related information, social cluster-related information, registration-related information, user profile information, social network-related information, etc. In some implementations, the data store 224 is coupled for communication with the various components 104, 106, 108, 202, 204, 206, 208, 210, 212, 214, 218, and 220 of the social network server 102. In some implementations, the data store 224 stores message-related information (e.g., aggregated electronic messages), cluster processing and ranking information, cluster summaries, records of the various requests that have been received (e.g., invitation requests, seed requests, reminder requests, content stream requests, connection requests, etc.), the social clusters and the users associated with those clusters, status information related to the invitation requests, information received from the other entities 110, 118, 120, 122, 124, 126, 128, and 130 of the system 100, etc.

In some implementations, the social network application 104, the seeding engine 108, the message aggregator 202, the cluster processor 204, the invitation module 206, the interface engine 208, the registration engine 210, the group creator 212, and the stream populator 214 are coupled to the data store 224 via the bus 216 to manipulate, i.e., store, query, update and/or delete data included in the data store 224 using programmatic operations. In some implementations, the data store 224 includes a database management system (DBMS) operable on the social network server 102 or another computing device and storable in the memory thereof. For example, the DBMS could be a structured query language (SQL) DBMS. In these implementations, the social network server 102, and in particular, the social network application 104 and the seeding engine 108 (and their respective sub-components) are coupled to the DBMS to store data in multi-dimensional tables comprised of rows and columns, and manipulate, i.e., insert, query, update and/or delete, rows of data using programmatic operations (e.g., SQL queries and statements).

Additional structure and functionality of the seeding engine 108 including the message aggregator 202, the cluster processor 204, and the invitation module 206; the social network application 104 including the interface engine 208, the registration engine 210, the group creator 212, and the stream populator 214 are further discussed below with reference to at least FIGS. 3-7.

Figure 3:
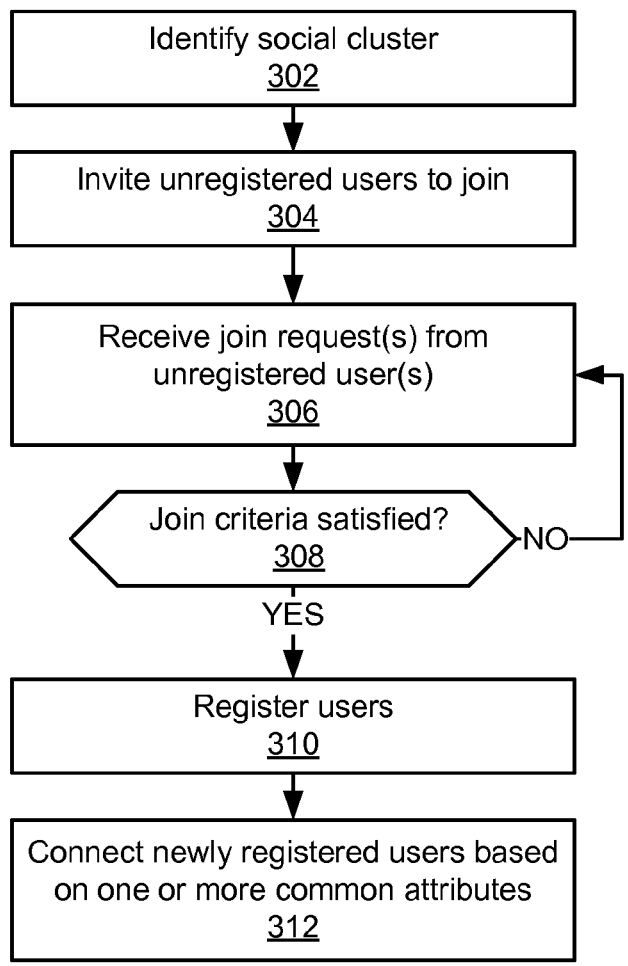
FIG. 3 is a flowchart of an example method for seeding user connections in a social network.
Figure 4A:
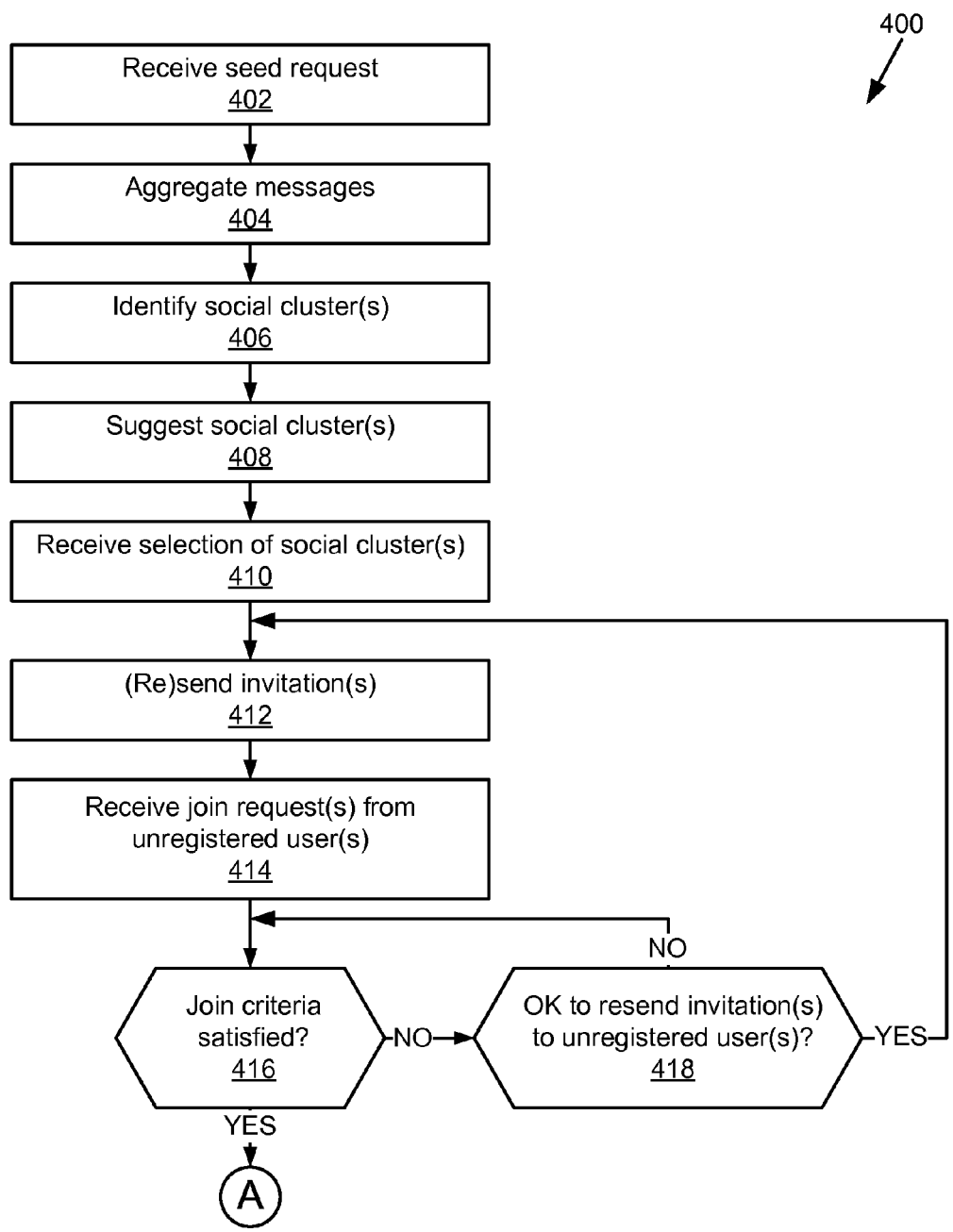
FIGS. 4A and 4B are flowcharts of another example method for seeding user connections in a social network.
Figure 4B:
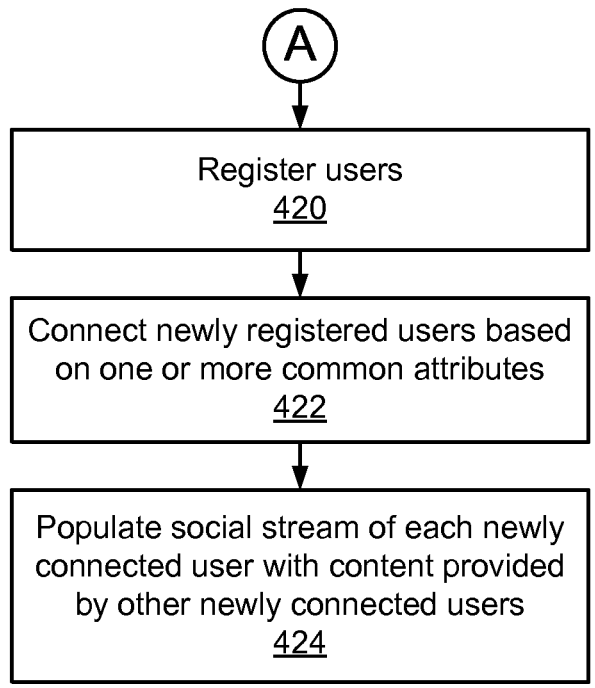
Figure 5:
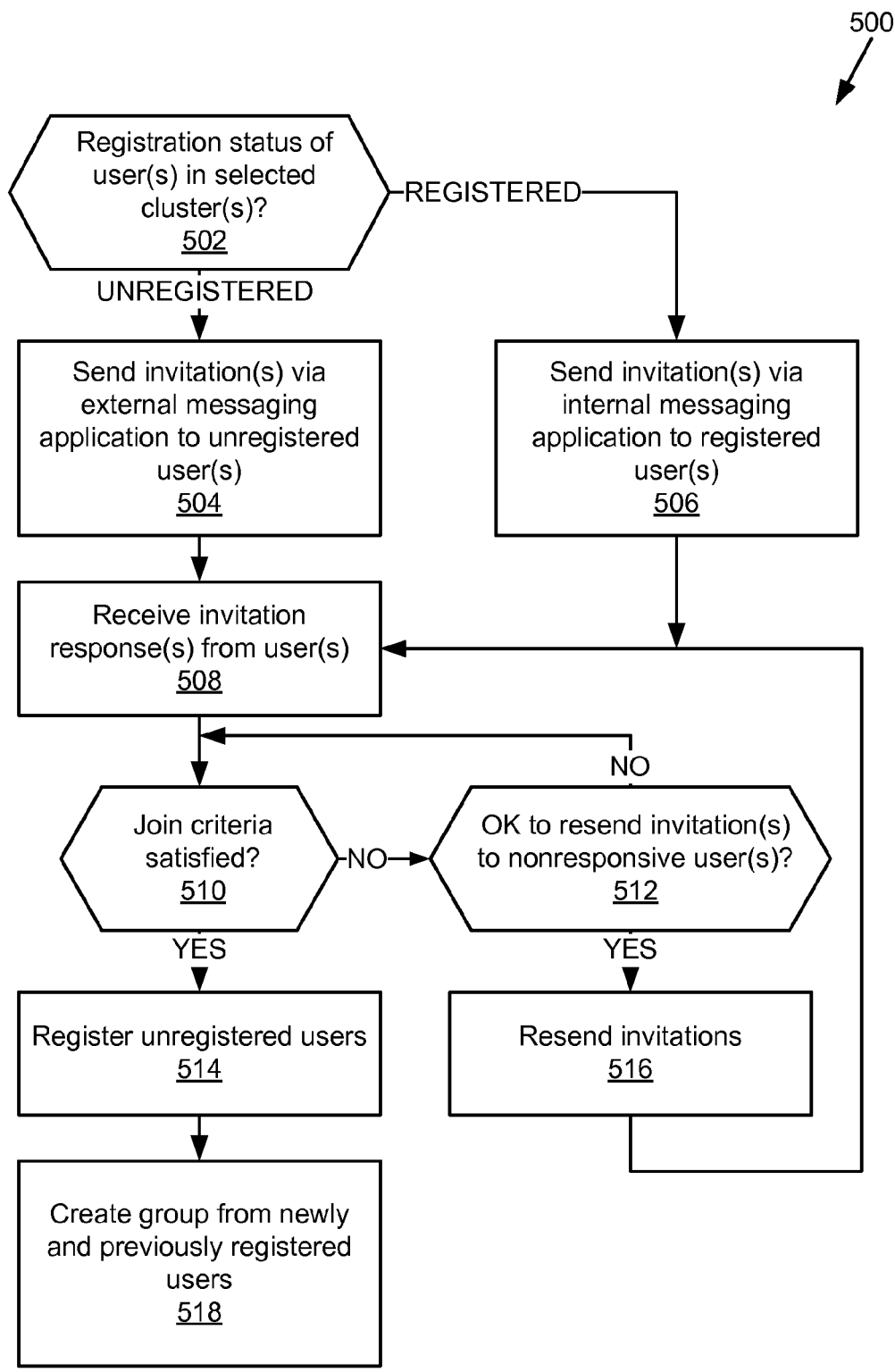
FIG. 5 is a flowchart of an example method for creating a group of users from seeded user connections.

Referring now to FIGS. 3-5, various implementations of the methods of the present disclosure are described.

FIG. 3 is a flowchart of an example method 300 for seeding user connections in a social network. The method 300 begins by identifying 302 a social cluster of users. In some implementations, the method 300 identifies the social cluster based at least in part on message-related information that is related to a given user. The social cluster includes users who are associated in some way (e.g., by virtue of having exchanged electronic messages). Some of these users can be unregistered users (i.e., not registered to use a social networking service). In some implementations, the message-related information is aggregated by the message aggregator 202. For example, the message aggregator 202 can aggregate the electronic messages (or information therefrom) of the user and the cluster processor 204 can process them for one or more clusters of users that have exchanged messages. In some implementations, the message-related information data may be aggregated and processed upon user consent or may be pre-computed but not used until consent is obtained. In some implementations, the method 300 identifies the social cluster in response to receiving a seed request from a user. A social cluster identified by the cluster processor 204 may include the user who submitted the seed request.

The method 300 continues by inviting 304 the users of the social cluster that are unregistered to join the social network. In some implementations, users are identified as unregistered by the cluster processor 204. For example, the cluster processor 204 can parse identifying information for each of the users from the message-related information aggregated by the message aggregator 202 and compare this identifying information with the registration information stored in the data store 224 or interact with the registration module 210 by providing this information to it to determine whether the users are registered with the social network. In other implementations, the invitation module 206 performs this operation independently or in cooperation with the cluster processor 204 and/or the registration engine 206. The method 300 can invite 304 these unregistered users to join the social network by respectively sending invitations to the unregistered users. For example, the invitation module 206 can respectively transmit the invitations via the network 132 to the client devices of the unregistered users. In one example, the invitation may describe the user that submitted the invitation request, the social cluster, and the unregistered users associated therewith, and request that the unregistered users become registered members the social network together. The invitation may also describe one or more join criteria that must be met for the unregistered users to be permitted to become members of the social network, including, for example, the number of unregistered users associated with the cluster who must accept their respective invitations to join the social network.

Next, the method 300 respectively receives 306 one or more join requests from one or more of the unregistered users and determines 308 whether one or more join criteria have been satisfied. In some implementations, the method 300 receives two, three, four, five, six, etc. or more requests to join the social networking service responsive to sending the invitations in block 304. In some implementations, the one or more join criteria may require a certain number of unregistered users of the social cluster to agree to join the social networking service in response to receiving their respective invitations. By way of illustration, if the social cluster includes ten unregistered users including the requestor, and the join criterion set by the social network application 104 is that at least five users must join, then at least four of the users of the cluster must accept the invitation in order for any of the users of the social cluster to be permitted to register.

If the one or more join criteria has not yet been satisfied in block 308, the method 300 returns to block 306 and waits for additional join requests to be submitted by the users of the cluster who were invited to join the social networking service. In some implementations, if a certain period of time has passed and the one or more join criteria have not yet been satisfied, the method 300 may inform the user that submitted the seed request of such and then may terminate. In other implementations, reminders may be sent by the method 300 to the users who have not yet responded to receiving the invitation, and after a certain number of reminders the method may notify the user who submitted the seed request of such and then may terminate. For example, the invitation module 206 may autonomously send reminders at various intervals or may receive a reminder request from the requestor and send the reminders in response. In yet other implementations, no time constraints are placed on the invitations and the users that have not yet responded to receiving invitations may have an indefinite amount of time to do so.

Based on the join criterion/criteria, the method 300 registers 310 each of the users who are interested to use the social networking service. In some implementations, the method 300 determines in block 308 whether the one or more join criteria have been satisfied in block 308, and if so, the method continues by registering 310 the users from whom a join request was received in block 306 with the social networking service. In some implementations, the registration engine 210 performs the operations described in block 306, 308, and 310. By way of example, to register the users, the method 300 may create registration records for each of these users in the data store 224.

Next, the method 300 connects 312 the newly registered users to one another on the social networking service. In some implementations, the method 300 connects the users by defining, in a social graph 106, a social graph connection between each of the users. The users can be connected based on one or more common attributes or features. For example, as part of the registration process, the registration module 210 may update the social graph information stored in the social graph 106 with the profile information for each of these users to generate the corrections. In another example, the registration module 210, the group creator 212, the social network application 104 or another sub-component thereof may define social graph connections (e.g., first degree connections), in the social graph 106 connecting the newly registered users. These connections can be based on fact that these users joined the social network together, exchanged electronic messages prior to joining the social network and/or other common features and attributes that were identified by the cluster processor 204 from the message-related information of the user that submitted the seed request. The method 300 is then complete and ends.

FIGS. 4A and 4B are flowcharts of another example method 400 for seeding user connections in a social network. The method 400 begins by receiving 402 a request from a user to identify a cluster of associated users. In some implementations, the request is received in the form of a seed request that requests one or more social clusters of users be identified from the electronic messages of the user. In some implementations, a user 116 submits the seed request via an associated user interface displayed by the user application 114 operating on the client device 112 of the user 116. In other implementations, the method 400 receives 402 the seed request in the form of a signal from the electronic messaging server 124 or another message server 110, 118, 120, or 122. For example, a user accessing his or her electronic messages managed by the electronic messaging server 124 may trigger the electronic messaging server 124 to send a seed request to the seeding engine 108. In this example, the electronic messaging server 124 could interact with the seeding engine 108 over the network 132 via an API or alternatively, an instance of the seeding engine 108 could be included in and operable by the electronic messaging server 124 and this instance of the seeding engine 108 could interact with the social network application 104 via an API over the network 132.

The method 400 continues by aggregating 404 message-related information of the user associated with the seed request. In some implementations, the message aggregator 202 aggregates electronic messages or information therefrom from various heterogeneous electronic message sources that are coupled to the network 132. For example, the message aggregator 202 aggregates electronic messages from one or more of the third party server 110, the IM server 118, the micro blogging server 120, the SMS/MMS server 122, and the electronic messaging server 124.

Next, the method 400 identifies 406 one or more social clusters of users from the message-related information. In some implementations, the cluster processor 204 processes the message-related information to identify groups of users who have communicated with the user associated with the seed request (also referred to as the requestor). For example, the requestor may frequently exchange electronic messages with the same or substantially the same groups of users and the cluster processor 204 can process the electronic messages of the requestor to identify these groups of users.

The method 400 then suggests 408 the one or more social clusters it has identified to the requestor for selection. In some implementations, cluster processor 204 in cooperation with the interface engine 208 generates and sends a cluster summary describing the one or more social clusters to the requestor for presentation via a cluster selection interface, and the requestor, using this interface, selects the cluster or clusters of users that he or she wants to invite to join the social network with. In response to suggesting 408 the one or more social clusters, the method 400 receives 410 a selection of one or more social clusters from the requestor. In some implementations, the invitation module 206 receives 410 the selection in the form of an invitation request.

The method 400 continues by sending 412 invitations to the unregistered users of the social cluster inviting them to join the social network with the requestor. In some implementations, the invitation module 206, responsive to receiving the invitation request, sends the invitations to the users of the one or more social clusters that were selected and included in the invitation request. The invitation module 206 can determine which of the users of the one or more social clusters are already registered users of the social network by using registration information stored in the data store 224 or by interacting with registration engine 208.

Next, the method 400 respectively receives 414 one or more join requests from one or more of the unregistered users and determines 416 whether one or more join criteria have been satisfied. For example, a join criterion may require a certain number of unregistered users of the one or more social clusters to agree to join the social network in response to receiving their respective invitations. If the one or more join criteria have not yet been satisfied in block 416, the method 400 determines 418 whether it is permitted to resend invitations to the unregistered users who have not yet responded to the invitations that were previously sent. In some implementations, the number of times invitations can be resent in block 412 is limited so as not to pester or annoy the unregistered users. If it is determined in block 418 that it is okay to resend invitations, the method 400 returns to block 412 and invitations are resent to the users who have not yet responded to the invitations that were previously sent. The sequence in blocks 412, 414, 416 and 418 can be repeated until the one or more join criteria are determined to be satisfied in block 416 or the method 400 terminates.

Once the one or more join criteria have been satisfied in block 416, the method 400 continues by registering 420 the users that responded to receiving an invitation. In some implementations, the registration engine 210 performs the operations described in block 414, 416, and 418 and interacts with the invitation module 206 to resend the invitations in block 412 (e.g., by sending the invitation module 206 a signal to resend the invitations). In some implementations, to register the users, the method 400 may create/maintain registration records for each of these users in the data store 224.

Next, the method 400 connects 422 the newly registered users based on one or more common attributes or features. For example, as part of the registration process, the registration module 210 may update the social graph information stored in the social graph 106 with the profile information for each of these users. In another example, the registration module 210, the group creator 212, the social network application 104, or another sub-component thereof may define first degree social graph connections in the social graph 106 directly connecting the newly registered users associated with the social cluster. These connections can be based on fact that these users joined the social network together, exchanged electronic messages prior to joining the social network, and/or other common features and attributes that were identified by the cluster processor 204 from the electronic messages of the user that submitted the seed request.

The method 400 continues by populating 424 the content stream of each newly connected user with the content provided by the other newly connected users. For example, the method 400 can receive a post from the requestor or one of the users who were connected in block 422 and can populate the respective content streams of the requestor and these users with the post. This is advantageous as it provides these new users with content in their content stream without them having to explicitly find and connect with other users on the social network. It also provides these new users with an engaging environment at the outset of their experience on the social network. The method 400 is then complete and ends.

While methods 300 and 400 are described primarily in context of seeding user connections using social clusters that include unregistered users, it should be understood that the social clusters can include both registered and unregistered users, that these registered users can be invited to connect with the unregistered users, that these registered users can be connected to the unregistered users once the one or more join criteria have been satisfied and they become registered, and that the social streams of these unregistered users can be populated with the content provided by the registered users and vice versa, as further described above with reference to at least FIG. 2.

FIG. 5 is a flowchart of an example method 500 for creating a group of users from seeded user connections. It should be understood that this method 500 is compatible and may be combined, in whole or in part, with the other methods and operations discussed herein including methods 300 and 400. The method 500 begins with one or more social clusters of users having already been selected by the requestor associated with a seed request. In block 502, the method 500 identifies/determines 502 which of the one or more social clusters are registered users of the social networking service and which are unregistered. For the users determined 502 to be registered, the method 500 continues by sending 506 an invitation to each of these users via an internal messaging application of the social network server 102 inviting that user to connect with the other registered users (if not already connected) and with the other unregistered users associated with the social cluster once they have been registered. For the users determined 502 to be unregistered with the social networking service, the method 500 continues by sending 504 an invitation to each of these users via an external messaging application, (e.g., operating on the electronic messaging server 124) inviting that user to join the social network with the other unregistered users and, once joined, to connect with any registered users included in the social cluster(s) if there are any.

The method 500 continues by receiving 508 one or more invitation responses (e.g., in the form of join requests or connection requests) from one or more of the users who received invitations in blocks 504 and/or 506, and determines 510 whether one or more join criteria have been satisfied. For example, the one or more join criteria may require a certain number of unregistered users of the social cluster(s) to agree to join the social network and/or a certain number of registered users to agree to connect with the other registered users and/or unregistered users (once registered) in response to receiving their respective invitations. By way of illustration, the one or more join criteria may be satisfied if the number of affirmative invitation responses received reaches a predetermined threshold (e.g., 3, 4, 5, 6, etc.) from the users of the social cluster(s) regardless of whether the users are already registered users of the social network or not. In another example, the one or more join criteria may be satisfied if at least certain percentage (e.g., 30%, 40%, 50%) of the total number of unregistered users agree to join the social network by sending an invitation response.

If the one or more join criteria has not yet been satisfied in block 510, the method 500 determines 512 whether it is permitted to resend 516 invitations to the unregistered and/or registered users who have not yet responded to the invitations that were previously sent. In some implementations, the number of times invitations can be resent in block 516 is limited so as not to pester or annoy the nonresponsive users. If it is determined in block 512 that it is okay to resend invitations to the nonresponsive users, the method 500 resends 516 the invitations and returns to block 508 and waits to receive invitation responses from these users. The sequence in blocks 508, 510, 512, and 516 can be repeated until the one or more join criteria are determined to be satisfied in block 416 or the method 500 terminates.

Once the one or more join criteria have been satisfied in block 510, the method 500 continues by registering 514 the unregistered users that responded to receiving an invitation. In some implementations, the registration engine 210 performs the operations described in blocks 508, 510, 512, 514, and 516, and interacts with the invitation module 206 to resend the invitations in block 516 (e.g., by sending the invitation module 206 a signal to resend the invitations).

The method 500 then continues to create 518 a shared group which includes the users who accepted their respective invitations. For example, the method 500 can create the shared group by defining, in the social graph 106, the shared group that includes the requestor of a seed request and the unregistered and/or registered users who respectively requested to join and/or connect. In some implementations, the group creator 212 defines the group by updating the social graph connection information stored in the social graph 106 with social graph connections (e.g., explicit first degree connections) between the users of the group and updating user profile information for each of the users of the group with information about the group (e.g., a group name).

A shared group can include a group that is already populated with users, either based on data generated by the seeding engine 108 and/or the social network application 104, or input provided by a user via an associated user interface. For example, a group including popular vocalists (who are also users of the social network) may be created by user 112*a* and shared with users 112*b* . . . *n* (via an associated user interface) so that users 112*b* . . . *n* do not also have to create the group but can benefit from user 112*a*'s efforts to create the group. In another example, the group creator 212 can create a group that includes the users that accepted their invitations as described herein and share it with each of those users. To share the group, an instance of the group is associated in the social graph 106 with each of the users the group is shared with, and each of these users can further customize his or her instance of the group (e.g., by deleting or adding users) without affecting any of the other instances of the group. In various implementations, the method 500 can also determine a name for the group based on the message-related information from which the one or more social clusters were determined, and can use the name for naming the group. The method 500 can also forgo creating the group and simply connect the users. In some implementations, the method 500 can connect the users to one another by defining, in the social graph 106, a social graph connection between each of the users. The method 500 is then complete and ends.

Figure 6:
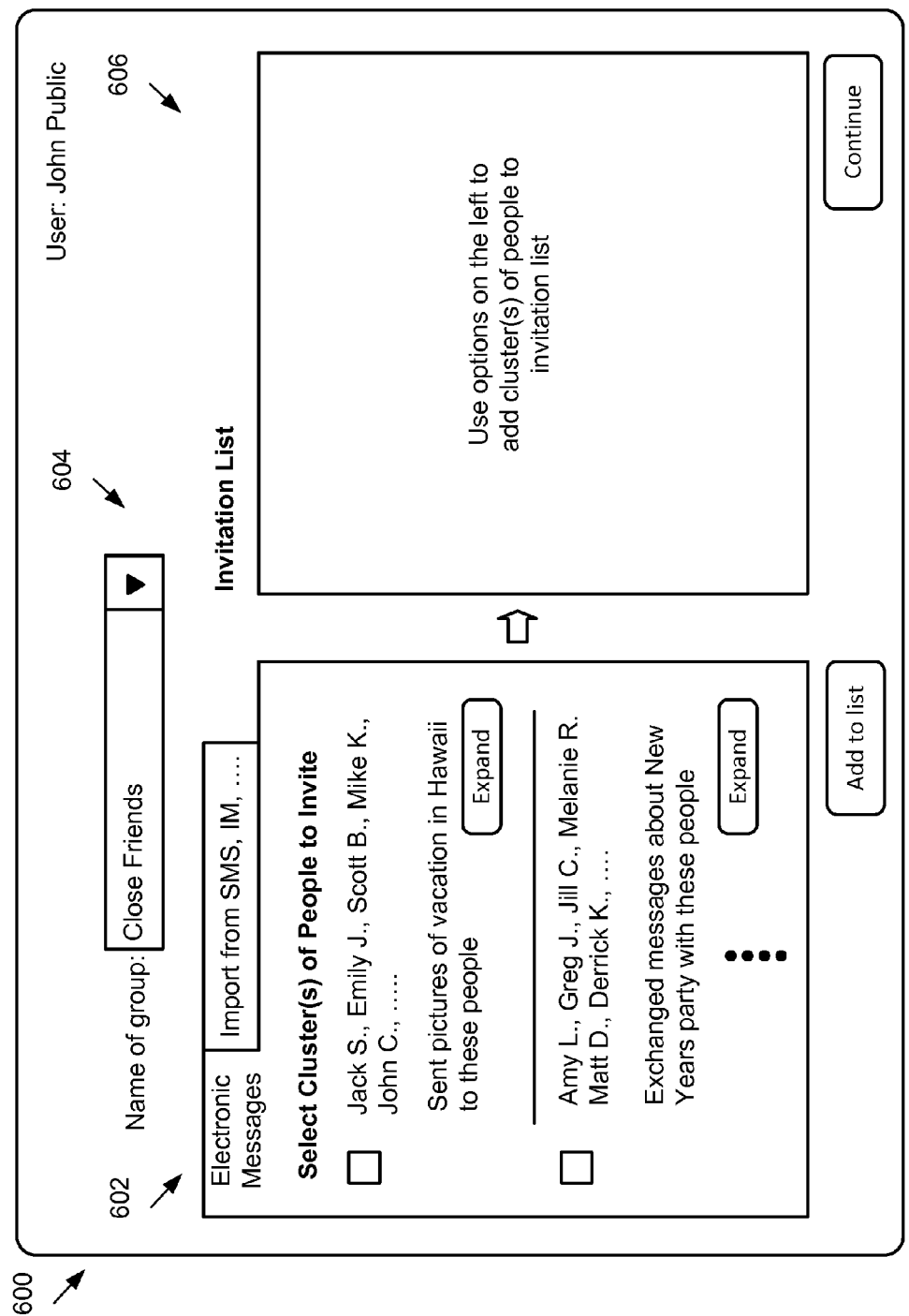
FIG. 6 is a graphic representation of an example cluster selection interface for inviting one or more identified social clusters of users to join a social network.

FIG. 6 is a graphic representation of an example cluster selection interface 600 for inviting one or more identified social clusters of users to join a social networking service. The user interface 600 can be generated by the client application 114 operating on a client device 112 and interacted with by a user 116. In the depicted implementation, the cluster selection interface 600 includes a tabbed cluster selection region 602, name selector 604, and an invitation region 606. The tabbed cluster selection region 602 includes an electronic message tab displaying a list of social clusters of people that were identified from electronic mail messages of the user John Public. In some implementations, the content for the cluster selection interface 600 is served by the electronic messaging server 124 and the social clusters listed in the electronic message portion of the tabbed cluster selection region 602 are social clusters that were identified from the electronic mail messages stored in the data store 126. In other implementations, the content for the cluster selection interface 600 is served by the social network server 102 and the social clusters listed in the electronic message portion of the tabbed cluster selection region are social clusters that were identified from the electronic mail messages stored in the data store 126. Other implementations are also contemplated and fall within the scope of present disclosure.

In some implementations, a social cluster listed in the tabbed cluster selection region 602 includes a selection box for selecting the cluster, lists the names of the people included in the social cluster, provides a description of how these people are connected to John Public, and includes an expand button (not labeled) for showing additional information about the clusters, the messages the cluster was derived from, etc. In the depicted implementation, to select a cluster, a user checks the checkboxes next to the clusters that the user wishes to select and then selects the button labeled "Add to list" to add the checked clusters to the invitation region 606. Then, upon clicking the button labeled "Continue," a seed request including the selected clusters is generated and transmitted by the user application 114 to the seeding engine 108 for processing.

In the depicted implementation, a list of suggestions for a group name that includes the users from social clusters is provided to user. The name selector can be any known selector or input element. In some implementations, the user can override the suggested names provided in the name selector 604 with a customized name input by the user. The name selected by the name selector 604 can then be included in the seed request transmitted to the seeding engine 108, and the group creator 212 can use the name when creating the group on the social networking service from the users included in the one or more social clusters selected by the user using the functionality provided by the tabbed cluster selection region 602.

FIG. 7 is a graphic representation of an example user interface 700 for displaying the status of an invitation request. In the depicted implementation, the user interface 700 includes a header region 702 and a summary region 704. The header region 702 includes details about the invitation request and the seed request upon which it is based. For example, the header region 702 includes information about when the invitation request was made, the name of the group to be created by the group creator 212, if the one or more join criteria for the invitation request have been satisfied, and information about the one or more criteria. For example, in the depicted implementation, the header region 702 describes the number of invitations that have been accepted by users of the social cluster, and the number of acceptances that are still needed in order to proceed to register the users who have accepted and create a group on the social networking service that includes these users. It should be understood that any information about one or more social clusters upon which the invitation request is based could be included in the user interface 700.

In the depicted implementation, the summary region 704 includes a table describing the users that were invited to join or connect on the social network, a status identifier identifying whether or not the users have accepted the invitations, and options to resend invitations to one or more of the users or to contact one or more of the users. Other information about the social clusters, the seed request, or the invitation request can also be included. For example, the summary region 704 can include whether or not a user of the social cluster is registered or unregistered, contact information for each of the users displayed in the summary region 704 including, for example, the electronic address used to contact the user, etc. In some implementations, when the user selects the hyperlink labeled "Contact" for a particular user, the user application 114 can generate an interface for sending an electronic message the user. In other implementations, when the user selects the hyperlink labeled "Resend invitation" for a particular user, the user application 114 can generate and send a request to the invitation module 206 requesting an invitation be resent to that user. In other implementations, the user interface 700 can include a global resend invitation element that, when selected, sends a request to the invitation module 206 via the network requesting that all users who have not yet accepted their respective invitations to accept be reminded/re-invited.

It should also be understood that the user interfaces described in FIGS. 6 and 7 are merely examples and that the interface elements may have a variety of distinct formats, content, positions within the window, and combinations, all of which are encompassed by the scope of the present disclosure.

Systems and methods for seeding user connections in a social network have been described. In the above description, for purposes of explanation, numerous specific details are set forth in order to provide a thorough understanding of this disclosure. It should be understood, however, that the systems, methods, and computer products described herein can be practiced without these specific details. In other instances, structures and devices are shown in block diagram form in order to avoid obscuring the disclosure. For example, the various components, operations, and/or features are described in some implementations above with reference to user interfaces and particular hardware. However, the present disclosure applies to any type of computing device that can receive data and commands, and any peripheral devices providing services.

Reference in the specification to "one implementation," "an implementation," "some implementations," etc., means that a particular feature, structure, or characteristic described in connection with the implementation is included in at least one implementation. The appearances of the phrase "in one implementation" or "in some implementations" in various places in the specification are not necessarily all referring to the same implementation.

Some portions of the detailed descriptions above are presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "defining" or "identifying" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment. Accordingly, the present disclosure is intended to be illustrative, but not limiting, of the subject matter set forth in the following claims.

What is claimed is:

1. A computer-implemented method comprising:
   aggregating, by one or more processors, message-related information related to a first user, wherein the aggregating includes searching metadata associated with message-related information;
   identifying, by the one or more processors, based at least in part on the aggregated message-related information related to the first user, a cluster of associated users that includes a plurality of unregistered users, the plurality of unregistered users not being registered to use a social networking service;
   generating, by the one or more processors, a cluster summary, wherein the cluster summary describes the cluster and identifies the plurality of unregistered users included in the cluster;
   sending, by the one or more processors, an invitation to each of the plurality of unregistered users identified in the cluster summary to join the social networking service;
   receiving, by the one or more processors, two or more requests to join the social networking service from two or more interested users, respectively, the two or more interested users included in the plurality of unregistered users identified in the cluster summary;
   determining, by the one or more processors, whether a join criterion has been satisfied; and
   responsive to determining the join criterion has been satisfied, registering, by the one or more processors, each of the two or more interested users to use the social networking service.

2. The computer-implemented method of claim 1, comprising:
   determining the join criterion as being satisfied based at least in part on a total number of the two or more requests to join the social networking service that were received, wherein the registering of each of the two or more interested users to use the social networking service is based at least in part on the determining of the join criterion as being satisfied.

3. The computer-implemented method of claim 1, comprising:
   receiving a request to identify the cluster of associated users from the first user, wherein the identifying, based at least in part on the message-related information related to the first user, the cluster of associated users includes aggregating the message-related information from one or more information sources storing electronic messages associated with the first user.

4. The computer-implemented method of claim 3, wherein the electronic messages include one or more of electronic mail messages, SMS/MMS messages, instant messages, social network posts, social network notifications, and micro blog posts.

5. The computer-implemented method of claim 1, comprising:
   upon the registering of each of the two or more interested users, connecting the two or more interested users to one another on the social networking service by defining, in a social graph, a social graph connection between each of the two or more interested users.

6. The computer-implemented method of claim 5, comprising:
   identifying, from among the cluster of associated users, a registered user that is registered to use the social networking service;
   sending an invitation to the registered user to connect with the plurality of unregistered users;
   receiving a connection request from the registered user accepting the invitation sent to the registered user; and
   connecting the registered user to each of the two or more interested users by defining, in the social graph, a social graph connection between the registered user and each of the two or more interested users.

7. The computer-implemented method of claim 5, comprising:
   connecting the first user to each of the two or more interested users by defining, in the social graph, a social graph connection between the first user and each of the two or more interested users, wherein the registering of each of the two or more interested users further includes registering the first user to use the social networking service based at least in part on the join criterion.

8. The computer-implemented method of claim 7, comprising:
   receiving a post from the first user or one of the two or more interested users; and
   populating a content stream of the first user and each of the two or more interested users with the post.

9. The computer-implemented method of claim 7, comprising:
   determining a shared group name based at least in part on the message-related information; and
   defining, in the social graph, a shared group including the first user and the two or more interested users based at least in part on the shared group name, the social graph connection between the first user and each of the two or more interested users, and the social graph connection between each of the two or more interested users.

10. A computer program product comprising a non-transitory computer-usable medium including a computer-readable program, wherein the computer-readable program, when executed on a computer, causes the computer to:
    aggregate message-related information related to a first user, wherein the aggregating includes searching metadata associated with message-related information;
    identify, based at least in part on the aggregated message-related information related to the first user, a cluster of associated users that includes a plurality of unregistered users, the plurality of unregistered users not being registered to use a social networking service;
    generate, by the one or more processors, a cluster summary, wherein the cluster summary describes the cluster and identifies the plurality of unregistered users included in the cluster;
    send an invitation to each of the plurality of unregistered users identified in the cluster summary to join the social networking service;
    receive two or more requests to join the social networking service from two or more interested users, respectively, the two or more interested users included in the plurality of unregistered users identified in the cluster summary;
determine whether a join criterion has been satisfied; and
responsive to determining the join criterion has been satisfied, register each of the two or more interested users to use the social networking service.

11. The computer program product of claim 10, wherein the computer-readable program further causes the computer to:
determine the join criterion as being satisfied based at least in part on a total number of the two or more requests to join the social networking service that were received, wherein to register of each of the two or more interested users to use the social networking service is based at least in part on the join criterion being determined as satisfied.

12. The computer program product of claim 10, wherein the computer-readable program further causes the computer to:
receive a request to identify the cluster of associated users from the first user, wherein to identify, based at least in part on the message-related information related to the first user, the cluster of associated users includes aggregating the message-related information from one or more information sources storing electronic messages associated with the first user.

13. The computer program product of claim 12, wherein the electronic messages include one or more of electronic mail messages, SMS/MMS messages, instant messages, social network posts, social network notifications, and micro blog posts.

14. The computer program product of claim 10, wherein the computer-readable program further causes the computer to:
connect, upon each of the two or more interested users being registered, the two or more interested users to one another on the social networking service by defining, in a social graph, a social graph connection between each of the two or more interested users.

15. The computer program product of claim 14, wherein the computer-readable program further causes the computer to:
identify, from among the cluster of associated users, a registered user that is registered to use the social networking service;
send an invitation to the registered user to connect with the plurality of unregistered users;
receive a connection request from the registered user accepting the invitation sent to the registered user; and
connect the registered user to each of the two or more interested users by defining, in the social graph, a social graph connection between the registered user and each of the two or more interested users.

16. The computer program product of claim 14, wherein the computer-readable program further causes the computer to:
connect the first user to each of the two or more interested users by defining, in the social graph, a social graph connection between the first user and each of the two or more interested users, wherein to register each of the two or more interested users further includes registering the first user to use the social networking service based at least in part on the join criterion.

17. The computer program product of claim 16, wherein the computer-readable program further causes the computer to:
receive a post from the first user or one of the two or more interested users; and
populate a content stream of the first user and each of the two or more interested users with the post.

18. The computer program product of claim 16, wherein the computer-readable program further causes the computer to:
determine a shared group name based at least in part on the message-related information; and
define, in the social graph, a shared group including the first user and the two or more interested users based at least in part on the shared group name, the social graph connection between the first user and each of the two or more interested users, and the social graph connection between each of the two or more interested users.

19. A system comprising:
a processor; and
a memory storing instructions that, when executed, cause the system to:
aggregate message-related information related to a first user, wherein the aggregating includes searching metadata associated with message-related information;
identify, based at least in part on the aggregated message-related information related to the first user, a cluster of associated users that includes a plurality of unregistered users, the plurality of unregistered users not being registered to use a social networking service;
generate, by the one or more processors, a cluster summary, wherein the cluster summary describes the cluster and identifies the plurality of unregistered users included in the cluster;
send an invitation to each of the plurality of unregistered users identified in the cluster summary to join the social networking service;
receive two or more requests to join the social networking service from two or more interested users, respectively, the two or more interested users included in the plurality of unregistered users identified in the cluster summary;
determine whether a join criterion has been satisfied; and
responsive to determining the join criterion has been satisfied, register each of the two or more interested users to use the social networking service.

20. The system of claim 19, wherein the instructions further cause the system to:
determine the join criterion as being satisfied based at least in part on a total number of the two or more requests to join the social networking service that were received, wherein to register of each of the two or more interested users to use the social networking service is based at least in part on the join criterion being determined as satisfied.

21. The system of claim 19, wherein the instructions further cause the system to:
receive a request to identify the cluster of associated users from the first user, wherein to identify, based at least in part on the message-related information related to the first user, the cluster of associated users includes aggregating the message-related information from one or more information sources storing electronic messages associated with the first user.

22. The system of claim 21, wherein the electronic messages include one or more of electronic mail messages, SMS/MMS messages, instant messages, social network posts, social network notifications, and micro blog posts.

23. The system of claim 19, wherein the instructions further cause the system to:

connect, upon each of the two or more interested users being registered, the two or more interested users to one another on the social networking service by defining, in a social graph, a social graph connection between each of the two or more interested users.

24. The system of claim 23, wherein the instructions further cause the system to:
identify, from among the cluster of associated users, a registered user that is registered to use the social networking service;
send an invitation to the registered user to connect with the plurality of unregistered users;
receive a connection request from the registered user accepting the invitation sent to the registered user; and
connect the registered user to each of the two or more interested users by defining, in the social graph, a social graph connection between the registered user and each of the two or more interested users.

25. The system of claim 23, wherein the instructions further cause the computer to:
connect the first user to each of the two or more interested users by defining, in the social graph, a social graph connection between the first user and each of the two or more interested users, wherein to register each of the two or more interested users further includes registering the first user to use the social networking service based at least in part on the join criterion.

26. The system of claim 25, wherein the instructions further cause the computer to:
receive a post from the first user or one of the two or more interested users; and
populate a content stream of the first user and each of the two or more interested users with the post.

27. The system of claim 25, wherein the instructions further cause the computer to:
determine a shared group name based at least in part on the message-related information; and
define, in the social graph, a shared group including the first user and the two or more interested users based at least in part on the shared group name, the social graph connection between the first user and each of the two or more interested users, and the social graph connection between each of the two or more interested users.

* * * * *